(12) United States Patent
Benedict et al.

(10) Patent No.: US 10,047,979 B2
(45) Date of Patent: *Aug. 14, 2018

(54) LINEARLY-ACTUATED MAGNETOCALORIC HEAT PUMP

(71) Applicant: Haier US Appliance Solutions, Inc., Wilmington, DE (US)

(72) Inventors: Michael Alexander Benedict, Louisville, KY (US); Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,547

(22) Filed: Jul. 19, 2016

(65) Prior Publication Data

US 2018/0023861 A1    Jan. 25, 2018

(51) Int. Cl.
*F25B 21/00* (2006.01)
*F25D 11/02* (2006.01)
*F25D 17/02* (2006.01)
*F25B 41/04* (2006.01)

(52) U.S. Cl.
CPC ............. *F25B 21/00* (2013.01); *F25B 41/04* (2013.01); *F25D 11/02* (2013.01); *F25D 17/02* (2013.01); *F25B 2321/0021* (2013.01); *F25B 2321/0023* (2013.01)

(58) Field of Classification Search
CPC ................ F25B 21/00; F25B 2321/002; F25B 2321/0021; F25B 2321/0022; F25B 2321/0023
See application file for complete search history.

(56) References Cited

U.S. PATENT DOCUMENTS

| 668,560 A | 2/1901 | Fulner et al. |
| 2,671,929 A | 3/1954 | Gayler |
| 2,765,633 A | 10/1956 | Muffly |
| 4,037,427 A | 7/1977 | Kramer |
| 4,107,935 A | 8/1978 | Steyert, Jr. |
| 4,200,680 A | 4/1980 | Sasazawa et al. |

(Continued)

FOREIGN PATENT DOCUMENTS

| CA | 2893874 A1 | 6/2014 |
| CA | 2919117 A1 | 1/2015 |

(Continued)

OTHER PUBLICATIONS

Journal of Alloys and Compounds, copyright 2008 Elsevier B..V.

(Continued)

*Primary Examiner* — Brian King
(74) *Attorney, Agent, or Firm* — Dority & Manning, P.A.

(57) ABSTRACT

A heat pump includes a magnet assembly which creates a magnetic field, and a regenerator housing which includes a body defining a plurality of chambers, each of the plurality of chambers extending along a transverse direction orthogonal to the vertical direction. The heat pump further includes a plurality of stages, each of the plurality of stages including a magnetocaloric material disposed within one of the plurality of chambers and extending along the transverse direction between a first end and a second end.

20 Claims, 13 Drawing Sheets

(56) References Cited

U.S. PATENT DOCUMENTS

| | | | |
|---|---|---|---|
| 4,259,843 A * | 4/1981 | Kausch | F25B 21/02 |
| | | | 62/3.1 |
| 4,507,927 A | 4/1985 | Barclay | |
| 4,507,928 A | 4/1985 | Johnson | |
| 4,549,155 A | 10/1985 | Halbach | |
| 4,554,790 A | 11/1985 | Nakagome et al. | |
| 4,599,866 A | 7/1986 | Nakagome et al. | |
| 4,625,519 A | 12/1986 | Hakuraku et al. | |
| 4,642,994 A | 2/1987 | Barclay et al. | |
| 4,785,636 A | 11/1988 | Hakuraku et al. | |
| 4,796,430 A * | 1/1989 | Malaker | F02G 1/043 |
| | | | 62/6 |
| 5,091,361 A | 2/1992 | Hed | |
| 5,156,003 A | 10/1992 | Yoshiro et al. | |
| 5,249,424 A | 10/1993 | DeGregoria et al. | |
| 5,336,421 A | 8/1994 | Kurita et al. | |
| 5,465,781 A | 11/1995 | DeGregoria | |
| 5,934,078 A | 8/1999 | Lawton, Jr. et al. | |
| 6,332,323 B1 | 12/2001 | Reid et al. | |
| 6,423,255 B1 | 7/2002 | Hoechsmann et al. | |
| 6,446,441 B1 | 9/2002 | Dean | |
| 6,588,215 B1 | 7/2003 | Ghoshal | |
| 6,668,560 B2 | 12/2003 | Zimm et al. | |
| 6,915,647 B2 | 7/2005 | Tsuchikawa et al. | |
| 6,935,121 B2 | 8/2005 | Fang et al. | |
| 6,946,941 B2 | 9/2005 | Chell | |
| 6,971,245 B2 | 12/2005 | Kuroyanagi | |
| 7,148,777 B2 | 12/2006 | Chell et al. | |
| 7,313,926 B2 | 1/2008 | Gurin | |
| 7,481,064 B2 | 1/2009 | Kitanovski et al. | |
| 7,552,592 B2 | 6/2009 | Iwasaki et al. | |
| 7,644,588 B2 | 1/2010 | Shin | |
| 7,897,898 B2 | 3/2011 | Muller et al. | |
| 8,069,662 B1 | 12/2011 | Albert | |
| 8,099,964 B2 | 1/2012 | Saito et al. | |
| 8,174,245 B2 | 5/2012 | Carver | |
| 8,191,375 B2 | 6/2012 | Sari et al. | |
| 8,209,988 B2 | 7/2012 | Zhang et al. | |
| 8,216,396 B2 | 7/2012 | Dooley et al. | |
| 8,310,325 B2 | 11/2012 | Zhang et al. | |
| 8,375,727 B2 | 2/2013 | Sohn | |
| 8,378,769 B2 | 2/2013 | Heitzler et al. | |
| 8,448,453 B2 | 5/2013 | Bahl et al. | |
| 8,551,210 B2 | 10/2013 | Reppel et al. | |
| 8,596,084 B2 | 12/2013 | Herrera et al. | |
| 8,616,009 B2 | 12/2013 | Dinesen et al. | |
| 8,656,725 B2 | 2/2014 | Muller et al. | |
| 8,695,354 B2 | 4/2014 | Heitzler et al. | |
| 8,729,718 B2 | 5/2014 | Kuo et al. | |
| 8,763,407 B2 | 7/2014 | Carroll et al. | |
| 8,769,966 B2 | 7/2014 | Heitzler et al. | |
| 8,869,541 B2 | 10/2014 | Heitzler et al. | |
| 8,904,806 B2 | 12/2014 | Cramet et al. | |
| 8,935,927 B2 | 1/2015 | Kobayashi et al. | |
| 9,175,885 B2 | 11/2015 | Katter | |
| 9,245,673 B2 | 1/2016 | Carroll et al. | |
| 9,377,221 B2 | 6/2016 | Benedict | |
| 9,400,126 B2 | 7/2016 | Takahashi et al. | |
| 9,523,519 B2 | 12/2016 | Muller | |
| 9,548,151 B2 | 1/2017 | Muller | |
| 9,599,374 B2 | 3/2017 | Takahashi et al. | |
| 9,631,843 B2 | 4/2017 | Benedict | |
| 9,702,594 B2 | 7/2017 | Vetrovec | |
| 9,739,510 B2 | 8/2017 | Hassen | |
| 9,797,630 B2 | 10/2017 | Benedict et al. | |
| 9,810,454 B2 | 11/2017 | Tasaki et al. | |
| 9,857,105 B1 | 1/2018 | Schroeder et al. | |
| 9,857,106 B1 | 1/2018 | Schroeder et al. | |
| 2002/0040583 A1 | 4/2002 | Barclay et al. | |
| 2003/0010054 A1 | 1/2003 | Esch et al. | |
| 2003/0051774 A1 | 3/2003 | Saito | |
| 2004/0093877 A1 | 5/2004 | Wada | |
| 2004/0182086 A1 | 9/2004 | Chiang et al. | |
| 2004/0187803 A1 | 9/2004 | Regev | |
| 2004/0250550 A1 | 12/2004 | Bruck | |
| 2005/0109490 A1 | 5/2005 | Harmon et al. | |
| 2006/0231163 A1 | 10/2006 | Hirosawa et al. | |
| 2007/0130960 A1 | 6/2007 | Muller et al. | |
| 2007/0220901 A1 | 9/2007 | Kobayashi | |
| 2008/0236171 A1 | 10/2008 | Saito et al. | |
| 2009/0091411 A1 * | 4/2009 | Zhang | H01F 7/0205 |
| | | | 335/306 |
| 2009/0158749 A1 | 6/2009 | Sandeman | |
| 2009/0217674 A1 | 9/2009 | Kaji et al. | |
| 2009/0266083 A1 | 10/2009 | Shin et al. | |
| 2010/0000228 A1 | 1/2010 | Wiest et al. | |
| 2010/0058775 A1 | 3/2010 | Kaji et al. | |
| 2010/0071383 A1 | 3/2010 | Zhang | |
| 2010/0116471 A1 | 5/2010 | Reppel | |
| 2010/0209084 A1 | 8/2010 | Nelson et al. | |
| 2010/0236258 A1 | 9/2010 | Heitzler et al. | |
| 2010/0276627 A1 | 11/2010 | Mazet | |
| 2011/0042608 A1 | 2/2011 | Reesink | |
| 2011/0048031 A1 | 3/2011 | Barve | |
| 2011/0048690 A1 | 3/2011 | Reppel et al. | |
| 2011/0058795 A1 | 3/2011 | Kleman et al. | |
| 2011/0082026 A1 | 4/2011 | Sakatani et al. | |
| 2011/0162388 A1 | 7/2011 | Barve et al. | |
| 2011/0168363 A9 | 7/2011 | Reppel et al. | |
| 2011/0173993 A1 | 7/2011 | Muller et al. | |
| 2011/0182086 A1 | 7/2011 | Mienko et al. | |
| 2011/0192836 A1 | 8/2011 | Muller et al. | |
| 2011/0239662 A1 | 10/2011 | Bahl et al. | |
| 2011/0284196 A1 | 11/2011 | Zanadi | |
| 2011/0302931 A1 | 12/2011 | Sohn | |
| 2011/0308258 A1 | 12/2011 | Smith et al. | |
| 2012/0031108 A1 | 2/2012 | Kobayashi et al. | |
| 2012/0033002 A1 | 2/2012 | Seeler et al. | |
| 2012/0036868 A1 | 2/2012 | Heitzler et al. | |
| 2012/0045698 A1 | 2/2012 | Shima | |
| 2012/0079834 A1 | 4/2012 | Dinesen | |
| 2012/0222427 A1 | 9/2012 | Hassen | |
| 2012/0222428 A1 | 9/2012 | Celik et al. | |
| 2012/0267090 A1 | 10/2012 | Kruglick | |
| 2012/0272666 A1 | 11/2012 | Watanabe | |
| 2012/0285179 A1 | 11/2012 | Morimoto | |
| 2012/0291453 A1 | 11/2012 | Watanabe et al. | |
| 2013/0019610 A1 | 1/2013 | Zimm et al. | |
| 2013/0180263 A1 | 7/2013 | Choi et al. | |
| 2013/0187077 A1 | 7/2013 | Katter | |
| 2013/0192269 A1 | 8/2013 | Wang | |
| 2013/0199460 A1 | 8/2013 | Duplessis et al. | |
| 2013/0227965 A1 | 9/2013 | Yagi et al. | |
| 2013/0232993 A1 | 9/2013 | Saito et al. | |
| 2013/0255279 A1 | 10/2013 | Tomimatsu et al. | |
| 2013/0269367 A1 | 10/2013 | Meillan | |
| 2013/0298571 A1 | 11/2013 | Morimoto et al. | |
| 2013/0319012 A1 * | 12/2013 | Kuo | F25B 21/00 |
| | | | 62/3.1 |
| 2013/0327062 A1 | 12/2013 | Watanabe et al. | |
| 2014/0020881 A1 | 1/2014 | Reppel et al. | |
| 2014/0075958 A1 * | 3/2014 | Takahashi | F25B 21/00 |
| | | | 62/3.1 |
| 2014/0116538 A1 | 5/2014 | Tanaka et al. | |
| 2014/0165594 A1 | 6/2014 | Benedict | |
| 2014/0165595 A1 | 6/2014 | Zimm et al. | |
| 2014/0190182 A1 * | 7/2014 | Benedict | F25B 21/00 |
| | | | 62/3.1 |
| 2014/0216057 A1 | 8/2014 | Oezcan | |
| 2014/0260373 A1 | 9/2014 | Gerber et al. | |
| 2014/0290273 A1 | 10/2014 | Benedict et al. | |
| 2014/0290275 A1 | 10/2014 | Muller | |
| 2014/0291570 A1 | 10/2014 | Klausner et al. | |
| 2014/0305137 A1 | 10/2014 | Benedict | |
| 2014/0305139 A1 * | 10/2014 | Takahashi | F25B 21/00 |
| | | | 62/3.1 |
| 2014/0325996 A1 | 11/2014 | Muller | |
| 2015/0007582 A1 | 1/2015 | Kim et al. | |
| 2015/0027133 A1 | 1/2015 | Benedict | |
| 2015/0030483 A1 | 1/2015 | Ryu | |
| 2015/0033762 A1 | 2/2015 | Cheng et al. | |
| 2015/0033763 A1 | 2/2015 | Saito et al. | |
| 2015/0047371 A1 | 2/2015 | Hu et al. | |
| 2015/0068219 A1 | 3/2015 | Komorowski et al. | |

(56) References Cited

U.S. PATENT DOCUMENTS

| | | |
|---|---|---|
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0362225 A1 | 12/2015 | Schwartz |
| 2016/0084544 A1 | 3/2016 | Radermacher et al. |
| 2016/0091227 A1 | 3/2016 | Leonard et al. |
| 2016/0355898 A1 | 12/2016 | Vieyra Villegas et al. |
| 2016/0356529 A1 | 12/2016 | Humburg |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0328603 A1 | 11/2017 | Barclay et al. |
| 2017/0370624 A1 | 12/2017 | Zimm et al. |

FOREIGN PATENT DOCUMENTS

| | | |
|---|---|---|
| CN | 101979937 | 10/2010 |
| CN | 101979937 A | 2/2011 |
| CN | 101788207 B | 9/2011 |
| CN | 202432596 U | 9/2012 |
| CN | 103090583 A | 5/2013 |
| CN | 103712401 A | 4/2014 |
| CN | 102077303 B | 4/2015 |
| DE | 102013223959 A1 | 5/2015 |
| EP | 2071255 A1 | 6/2009 |
| EP | 2108904 A1 | 10/2009 |
| FR | 2935468 A1 | 3/2010 |
| JP | 59232922 | 12/1984 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2017207222 A | 11/2017 |
| KR | 101100301 B1 | 12/2011 |
| KR | 1238234 B1 | 3/2013 |
| WO | WO0212800 A1 | 2/2002 |
| WO | WO03016794 A1 | 2/2003 |
| WO | WO2004/068512 | 8/2004 |
| WO | WO2007/036729 A1 | 4/2007 |
| WO | WO2009/024412 | 2/2009 |
| WO | WO2011034594 A1 | 3/2011 |
| WO | WO 2014099199 A1 | 6/2014 |
| WO | WO 2014170447 A1 | 10/2014 |
| WO | WO2014173787 A1 | 10/2014 |
| WO | WO 2015017230 A1 | 2/2015 |
| WO | WO 2017042266 A1 | 3/2017 |

OTHER PUBLICATIONS

Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.
Effects of annealing on the magnetic entropy change and exchange bias behavior in melt-spun Ni—Mn—In ribbons, X.Z. Zhao, C.C. Hsieh, et al Science Direct, Scripta Materialia 63 (2010).
PCT International Search Report dated Mar. 6, 2014.
International Search Report and Written Opinion issued in connection with PCT Application No. PCT/US2014/042485 dated Oct. 31, 2014.
International Search Report and Written Opinion issued in connection with PCT Application No. PCT/US2014/017431 dated May 16, 2014.
International search report issued in connection with PCT/US2013/070518, dated Jan. 30, 2014.
Tetsuji Okamura, Performance of a room-temperature rotary magnet refrigerator, dated Nov. 28, 2005, Elsevier.
Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.
Andrej Kitanovski, Present and future caloric refrigeration and heat-pump technologies, International Journal of Refrigeration, vol. 57, Sep. 2015, pp. 288-298.

* cited by examiner

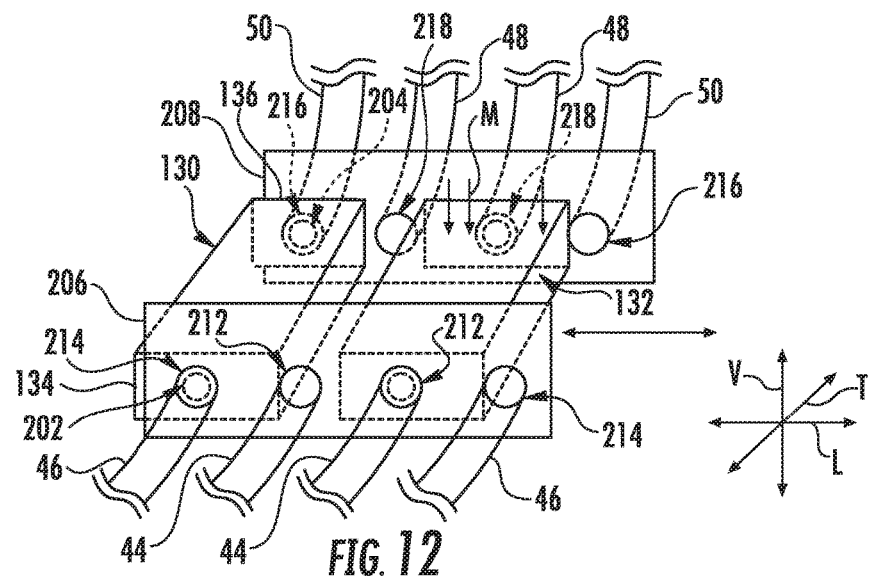
FIG. 12
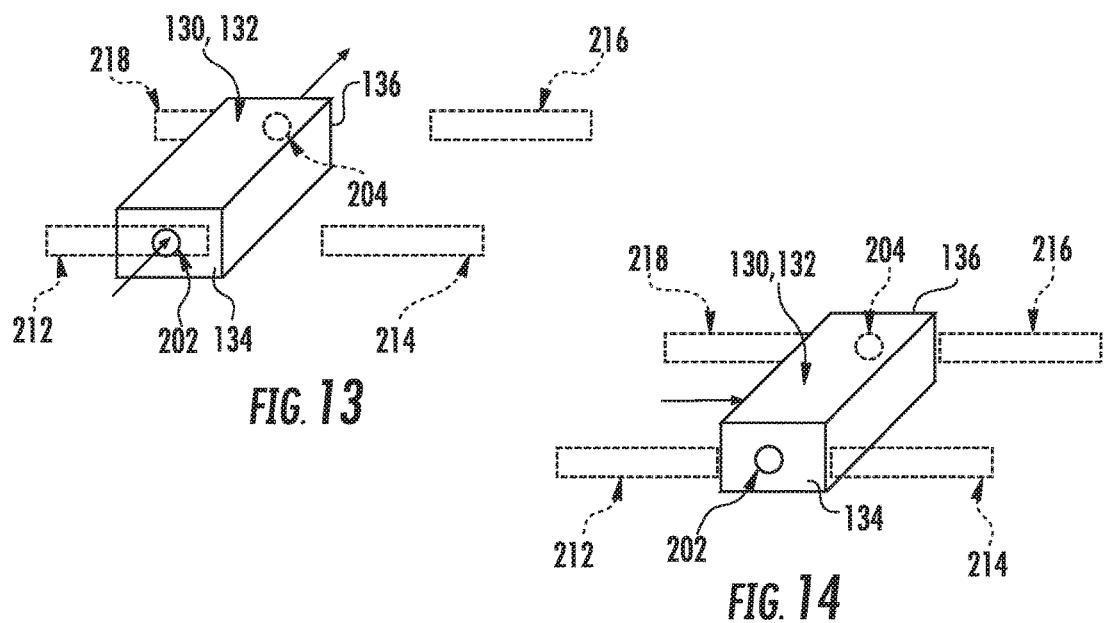
FIG. 13
FIG. 14
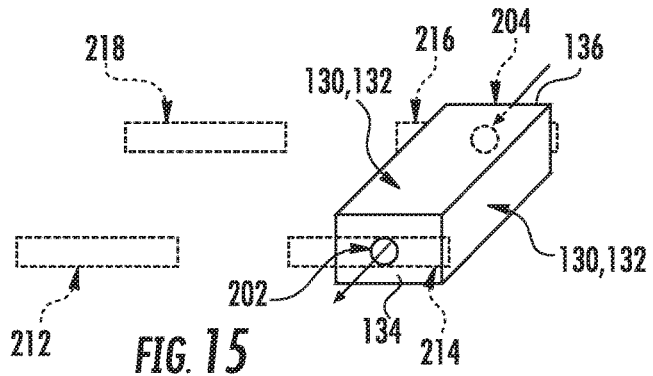
FIG. 15

LINEARLY-ACTUATED MAGNETOCALORIC HEAT PUMP

FIELD OF THE INVENTION

The subject matter of the present disclosure relates generally to a heat pump system that uses magnetocaloric materials to exchange heat with a circulating heat transfer fluid.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from a refrigeration compartment and the rejecting of such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about 45 percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magnetocaloric materials (MCMs)—i.e. materials that exhibit the magnetocaloric effect—provide a potential alternative to fluid refrigerants for heat pump applications. In general, the magnetic moments of an MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCMs exhibit the opposite behavior—i.e. generating heat when the magnetic field is removed (which are sometimes referred to as para-magnetocaloric material but both types are referred to collectively herein as magnetocaloric material or MCM). The theoretical Carnot cycle efficiency of a refrigeration cycle based on an MCM can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Additionally, as stated above, the ambient conditions under which a heat pump may be needed can vary substantially. For example, for a refrigerator appliance placed in a garage or located in a non-air conditioned space, ambient temperatures can range from below freezing to over 90° F. Some MCMs are capable of accepting and generating heat only within a much narrower temperature range than presented by such ambient conditions.

Accordingly, a heat pump system that can address certain challenges such as those identified above would be useful. Such a heat pump system that can also be used in e.g., a refrigerator appliance would also be useful.

BRIEF DESCRIPTION OF THE INVENTION

Additional aspects and advantages of the invention will be set forth in part in the following description, or may be apparent from the description, or may be learned through practice of the invention.

In accordance with one embodiment, a heat pump is provided. The heat pump includes a magnet assembly, the magnet assembly creating a magnetic field. The heat pump further includes a regenerator housing, the regenerator housing including a body defining a plurality of chambers, each of the plurality of chambers extending along a transverse direction orthogonal to the vertical direction. The heat pump further includes a plurality of stages, each of the plurality of stages including a magnetocaloric material disposed within one of the plurality of chambers and extending along the transverse direction between a first end and a second end.

In accordance with another embodiment, the present disclosure is directed to a heat pump system. The heat pump system includes a cold side heat exchanger configured for heat removal from a first local environment, and a hot side heat exchanger configured for heat delivery to a second local environment. The heat pump system further includes a first pump for circulating a working fluid between the cold side heat exchanger and the hot side heat exchanger, and a second pump for circulating a working fluid between the cold side heat exchanger and the hot side heat exchanger. The heat pump system further includes a heat pump in fluid communication with the cold side heat exchanger, the hot side heat exchanger, the first pump and the second pump. The heat pump includes a magnet assembly, the magnet assembly creating a magnetic field. The heat pump further includes a regenerator housing, the regenerator housing including a body defining a plurality of chambers, each of the plurality of chambers extending along a transverse direction orthogonal to the vertical direction. The heat pump further includes a plurality of stages, each of the plurality of stages including a magnetocaloric material disposed within one of the plurality of chambers and extending along the transverse direction between a first end and a second end.

In some embodiments, one of the regenerator housing or the magnet assembly is movable relative to the other of the regenerator housing or the magnet assembly along a longitudinal direction orthogonal to the vertical direction and the transverse direction.

In some embodiments, in a first position along the longitudinal direction the regenerator housing is positioned such that a first stage of the plurality of stages is within the magnetic field and a second stage of the plurality of stages is out of the magnetic field. In a second position along the longitudinal direction the regenerator housing is positioned such that the first stage of the plurality of stages is out of the magnetic field and the second stage of the plurality of stages is within the magnetic field.

In some embodiments, the heat pump further includes a cam connected to one of the regenerator housing or the magnet assembly. The one of the regenerator housing or the magnet assembly is movable relative to the other of the regenerator housing or the magnet assembly along a longitudinal direction orthogonal to the vertical direction and the transverse direction due to rotation of the cam.

In some embodiments, the plurality of chambers of the regenerator housing include a plurality of first chambers and at least one second chamber, the first and second chambers disposed in an alternating arrangement along the longitudinal direction. An insulative material is disposed within the at least one of the plurality of second chambers.

In some embodiments, the magnet assembly includes a first magnet and a second magnet, the first magnet and the second magnet spaced apart along a vertical direction such that a gap is defined between the first magnet and the second magnet and a magnetic field is created in the gap.

In some embodiments, the support frame includes an upper frame member and a lower frame member spaced apart along the vertical direction from the upper frame member, the support frame further including an adjustable intermediate member disposed between the upper frame member and the lower frame member, wherein the first magnet is connected to the upper frame member and the second magnet is connected to the lower frame member, and wherein adjustment of the adjustable intermediate member adjusts a length of the gap.

In some embodiments, a width along the longitudinal direction of the first magnet and a width along the longitudinal direction of the second magnet are greater than or equal to widths along the longitudinal direction of each of the plurality of stages In some embodiments, the heat pump further comprises a bearing assembly, wherein the regenerator housing is a component of the bearing assembly.

In some embodiments, each of the plurality of stages further defines a first aperture at the first end and a second aperture at the second end. Working fluid is flowable from a stage though the second aperture and to the stage through the first aperture when the stage is in the magnetic field. Working fluid is flowable from a stage though the first aperture and to the stage through the second aperture when the stage is out of the magnetic field.

In some embodiments, the heat pump further includes a plurality of flexible lines in fluid communication with each of the plurality of stages.

In some embodiments, the heat pump further includes a plurality of lines in fluid communication with each of the plurality of stages, each of the plurality of lines comprising an inner sleeve and an outer sleeve, the inner sleeve at least partially disposed within the outer sleeve. One of the inner sleeve or the outer sleeve of each of the plurality of lines is movable relative to the other of the inner sleeve or the outer sleeve of that line during movement of the one of the regenerator housing or the magnet assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 12 is a schematic perspective view of MCM stages and associated seals in accordance with one embodiment of the present disclosure;

FIG. 13 is a top view of MCM stages in a first position in accordance with one embodiment of the present disclosure;

FIG. 14 is a top view of the MCM stages of FIG. 13 between a first position and a second position;

FIG. 15 is a top view of the MCM stages of FIG. 14 in a second position;

DETAILED DESCRIPTION OF THE INVENTION

Figure 1:
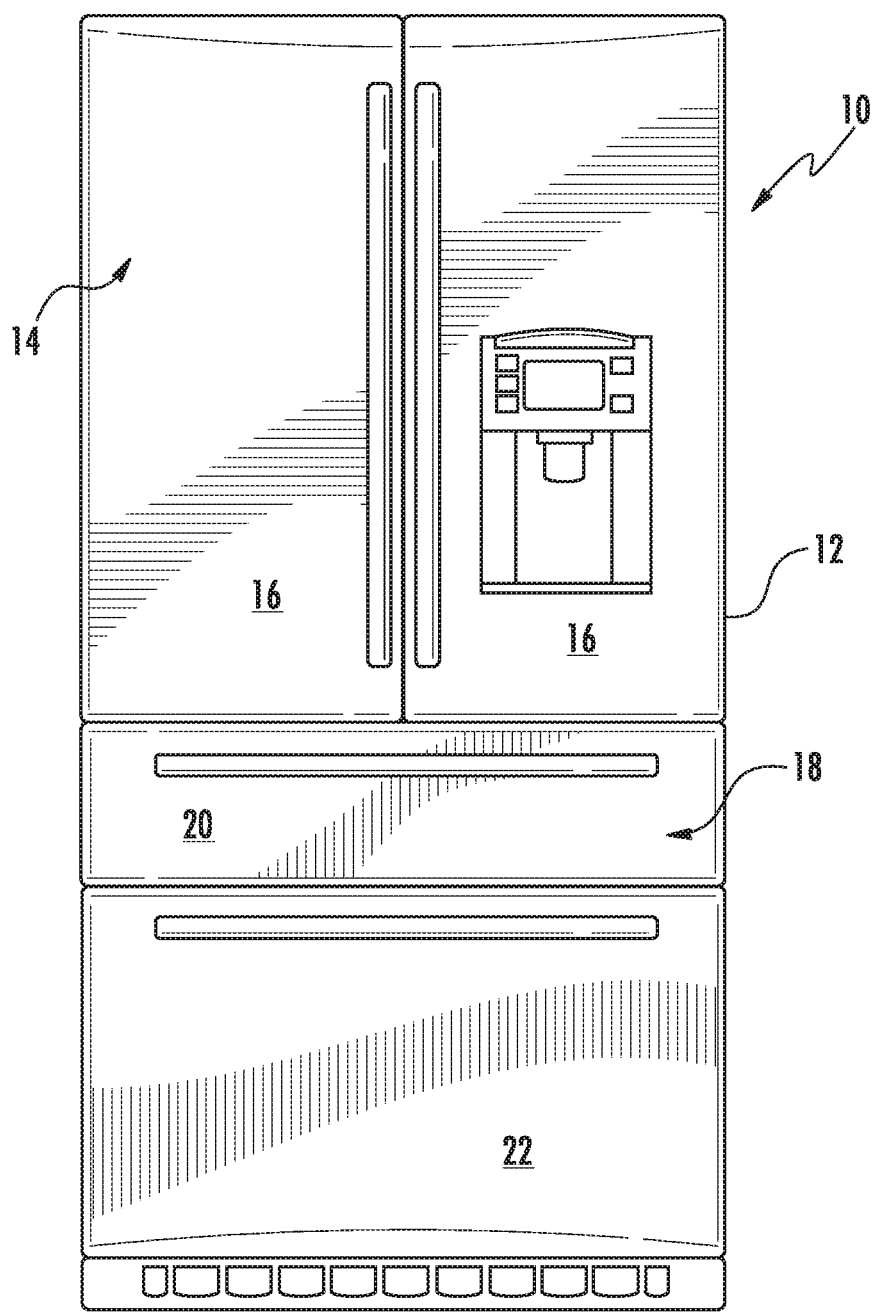
FIG. 1 is a refrigerator appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
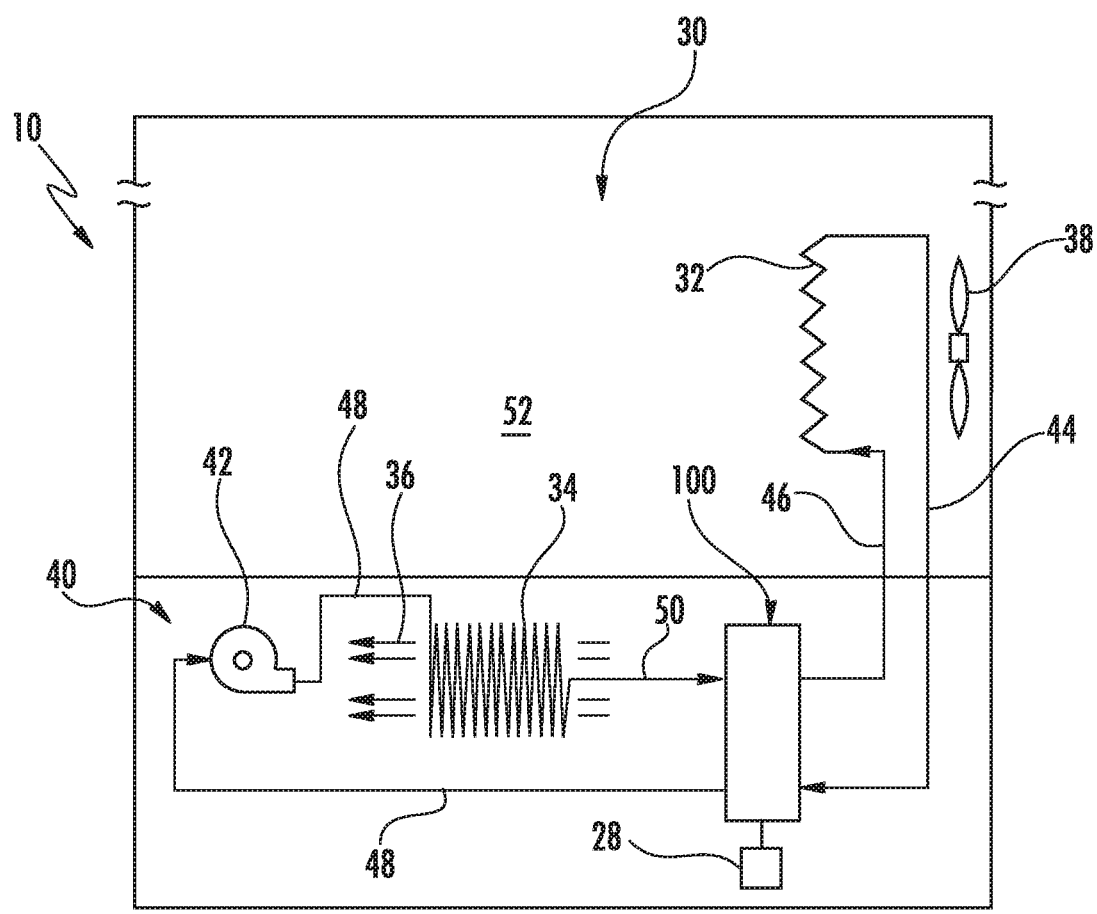
FIG. 2 is a schematic illustration of a heat pump system positioned in an exemplary refrigerator with a machinery compartment and a refrigerated compartment in accordance with one embodiment of the present disclosure.

FIG. 2 is a schematic view of another exemplary embodiment of a refrigerator appliance 10 including a refrigeration compartment 30 and a machinery compartment 40. In particular, machinery compartment 30 includes a heat pump system 52 having a first or cold side heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from magnetocaloric material (MCM) in heat pump 100 and carries this heat by line 48 to pump 42 and then to second or hot side heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will further described.

From second heat exchanger 34 the heat transfer fluid returns by line 50 to heat pump 100 where, as will be further described below, the heat transfer fluid loses heat to the MCM in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well.

FIGS. 3 through 21 illustrate exemplary heat pumps 100 and components thereof, and the use of such heat pumps 100 with heat pump system 52, in accordance with embodiments of the present disclosure. Components of the heat pump 100 may be oriented relative to a coordinate system for the heat pump 100, which may include a vertical direction V, a transverse direction T, and a longitudinal direction L all of which may be mutually orthogonal to each other.

Heat pump 100 includes one or more magnet assemblies 110, each of which creates a magnetic field M. For example, a magnetic field M may be generated by a single magnet, or by multiple magnets.

In exemplary embodiments as illustrated, a first magnet 112 and a second magnet 114 may be provided, and the magnetic field M may be generated between the magnets. The magnets 112, 114 may, for example, have opposite magnetic polarities such that they either attract or repel each other.

The magnets 112, 114 of a magnet assembly 110 may be spaced apart from each other, such as along a vertical direction V. A gap 116 may thus be defined between the first magnet 112 and the second magnet 114, such as along the vertical direction V.

The heat pump 100 may further include a support frame 120 which supports the magnet assembl(ies) 110. A magnet assembly 110 may be connected to the support frame 120. For example, each magnet 112, 114 of the magnet assembly 110 may be connected to the support frame 120. Such connection in exemplary embodiments is a fixed connection via a suitable adhesive, mechanical fasteners, and/or a suitable connecting technique such as welding, brazing, etc. The support assembly 120 may, for example, support the magnets 112, 114 in position such that the gap 114 is defined between the magnets 112, 114.

As illustrated, support frame 120 is an open-style frame, such that interior portions of the support frame 120 are accessible from exterior to the support frame 120 (i.e. in the longitudinal and transverse directions L, T) and components of the heat pump 100 can be traversed from interior to the support frame 120 to exterior to the support frame 120 and vice-versa. For example, support frame 120 may define one or more interior spaces 122. Multiple interior spaces 122, as shown, may be partitioned from each other by frame members or other components of the support frame 120. An interior space 122 may be contiguous with associated magnets 112, 114 (i.e. magnet assembly 110) and gap 116, such as along the longitudinal direction L. Support frame 120 may additionally define one or more exterior spaces 124, each of which includes the exterior environment proximate the support frame 120. Specifically, an exterior space 124 may be contiguous with associated magnets 112, 114 (i.e. magnet assembly 110) and gap 116, such as along the longitudinal direction L. An associated interior space 122 and exterior space 124 may be disposed on opposing sides of associated magnets 112, 114 (i.e. magnet assembly 110) and gap 116, such as along the longitudinal direction L.

Figure 5:
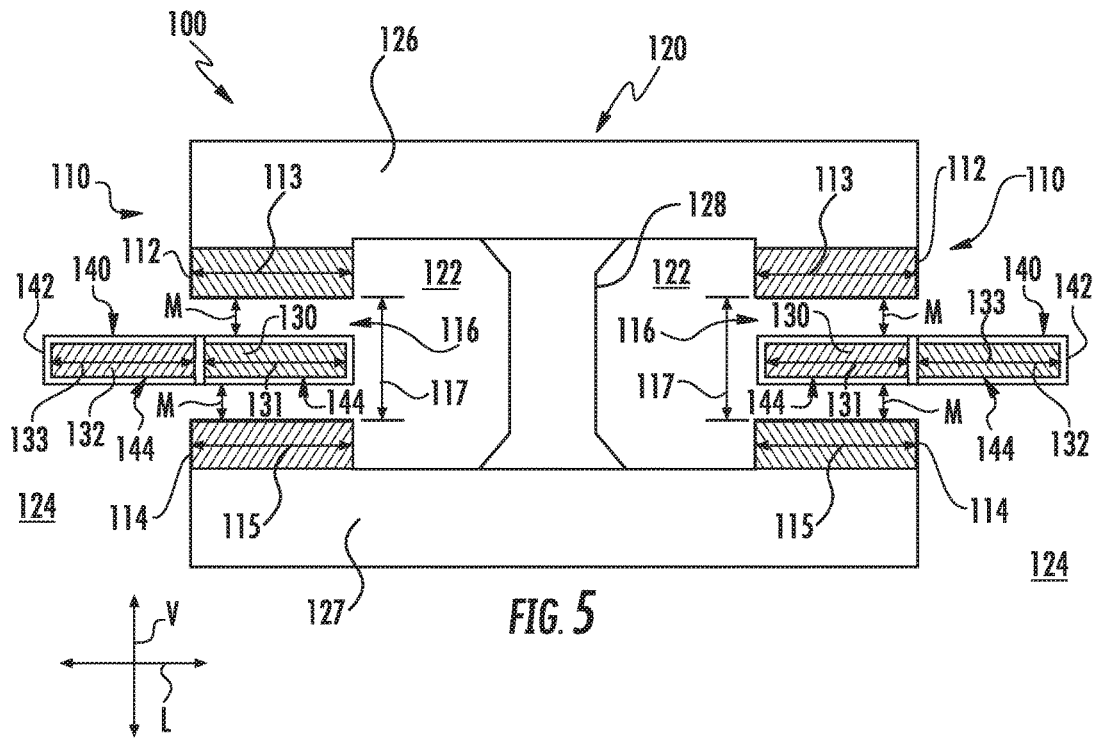
FIG. 5 is a front view of components of a heat pump, with first stages of MCM within magnetic fields and second stages of MCM out of magnetic fields, in accordance with one embodiment of the present disclosure.
Figure 6:
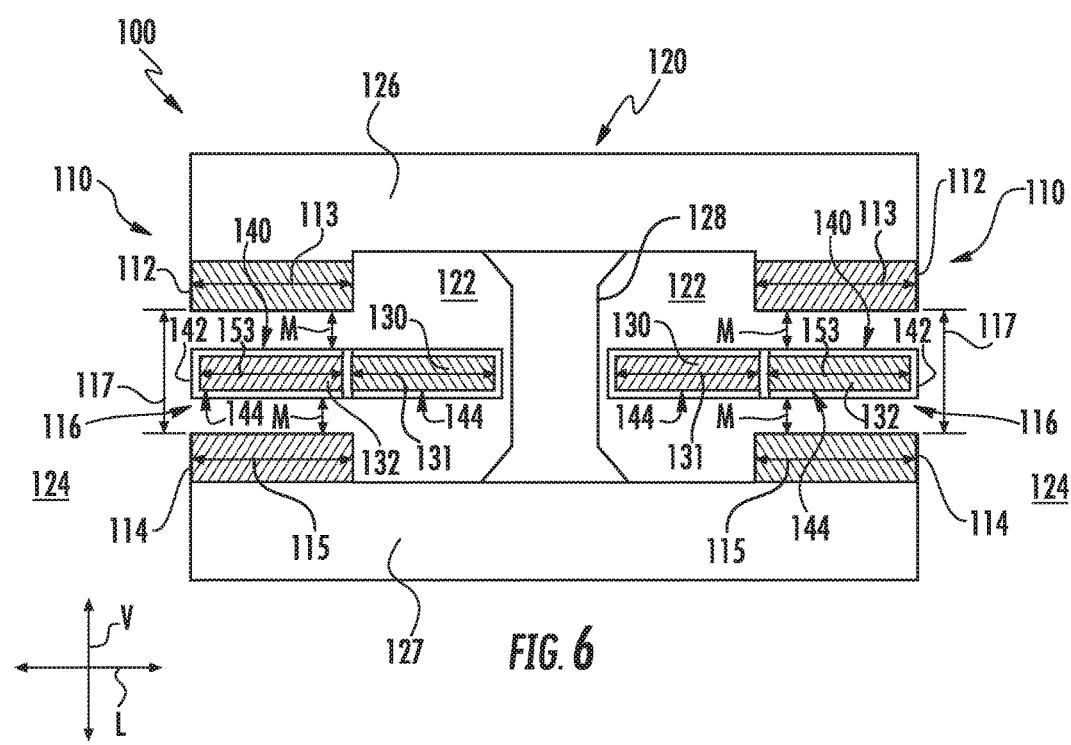
FIG. 6 is a front view of components of a heat pump, with first stages of MCM out of magnetic fields and second stages of MCM within magnetic fields, in accordance with one embodiment of the present disclosure.
Figure 18:
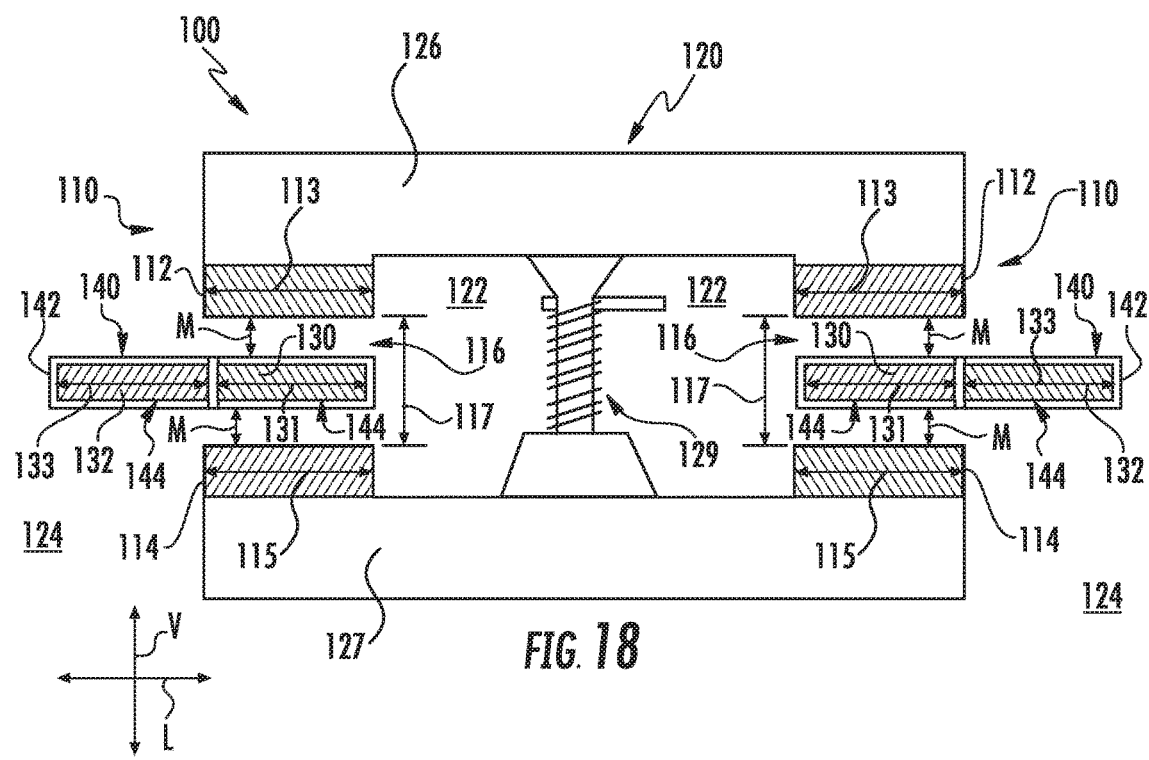
FIG. 18 is a front view of components of a heat pump, with first stages of MCM out of magnetic fields and second stages of MCM within magnetic fields, in accordance with one embodiment of the present disclosure.

As illustrated in FIGS. 5, 6 and 18, the support frame 120 and frame members and other components thereof may include and form one or more C-shaped portions. A C-shaped portion may, for example, define an interior space 122 and associated gap 116, and may further define an associated exterior space 124 as shown.

In exemplary embodiments as illustrated, a support frame 120 may support two magnet assemblies 110, and may define an interior space 122, gap 116, and exterior space 124 associated with each of the two magnet assemblies 110. Alternatively, however, a support frame 120 may support only a single magnet assembly 110 or three or more magnet assemblies 110.

Various frame members may be utilized to form the support frame 120. For example, in some embodiments, an upper frame member 126 and a lower frame member 127 may be provided. The lower frame member 127 may be spaced apart from the upper frame member 126 along the vertical axis V. The first magnet(s) 112 may be connected to the upper frame member 126, and the second magnet(s) 114 may be connected to the lower frame member 127. In exemplary embodiments, the upper frame member 126 and lower frame member 127 may be formed from materials which have relatively high magnetic permeability, such as iron.

In some embodiments, as illustrated in FIGS. 5 and 6, a support frame 120 may further include an intermediate frame member 128. The intermediate frame member 128 may be disposed and extend between and connect the upper frame member 126 and lower frame member 127, and may in some embodiments be integrally formed with the upper and lower frame members 126, 127. As shown, multiple interior spaces 122 may be partitioned from each other by intermediate frame member 128. In some embodiments, the intermediate frame member 128 may be formed from materials which have relatively high magnetic permeability, such as iron. In other embodiments, the intermediate frame member 128 may be formed from materials which have relatively lower magnetic permeability than those of the upper and lower frame members 126, 127. Accordingly, such materials, termed magnetically shielding materials herein, may facilitate direction of magnetic flux paths only through the upper and lower frame members 126, 127 and magnet assemblies 110, advantageously reducing losses in magnetic strength, etc.

In embodiments wherein an intermediate frame member 128 is utilized, lengths (i.e. maximum lengths) 117 of the gaps 116 may be fixed and non-adjustable.

In other embodiments, as illustrated in FIG. 18, the lengths 117 may advantageously be adjustable. For example, a support frame 120 may further include an adjustable intermediate member 129. The adjustable intermediate member 129 may be disposed and extend between and connect the upper frame member 126 and lower frame member 127. As shown, multiple interior spaces 122 may be partitioned from each other by adjustable intermediate member 129. In some embodiments, the adjustable intermediate member 129 may be formed from materials which have relatively high magnetic permeability, such as iron. In other embodiments, the adjustable intermediate member 129 may be formed from materials which have relatively lower magnetic permeability than those of the upper and lower frame members 126, 127. Accordingly, such materials, termed magnetically shielding materials herein, may facilitate direction of magnetic flux paths only through the upper and lower frame members 126, 127 and magnet assemblies 110, advantageously reducing losses in magnetic strength, etc.

Adjustment of the adjustable intermediate member 129 may adjust the length(s) 117 of the gap(s) 116, increasing or decreasing the gap(s) 116 as desired. Accordingly, the gap(s) 116 may be adjusted to achieve optimal magnetic fields M for operation of heat pumps 100 in accordance with the present disclosure. In exemplary embodiments as shown, the adjustable intermediate member 129 may be or include a screw jack. Alternatively, other suitable adjustable mechanisms may be utilized, such as pulley systems, other mechanical gear-based systems, electronically actuated systems, etc.

Referring again to FIGS. 3 through 21, a heat pump 100 may further include a plurality of stages, each of which includes a magnetocaloric material (MCM). In exemplary embodiments, such MCM stages may be provided in pairs, each of which may for example include a first stage 130 and a second stage 132. Each stage 130, 132 may include one or more different types of MCM. Further, the MCM(s) provided in each stage 130, 132 may be the same or may be different.

When provided in heat pump 100, each stage 130, 132 may extend, such as along the transverse direction T, between a first end 134 and a second end 136. As discussed herein, working fluid (also referred to herein as heat transfer fluid or fluid refrigerant) may flow into each stage 130, 132 and from each stage 130, 132 through the first end 134 and second end 136. Accordingly, working fluid flowing through a stage 130, 132 during operation of heat pump 100 flows generally along the transverse direction T.

Stages 130, 132, such as each pair of stages 130, 132, may be disposed within regenerator housings 140. The regenerator housing 140 along with the stages 130, 132 and optional insulative materials 138 may collectively be referred to as a regenerator assembly. A housing 140 includes a body 142 which defines a plurality of chambers 144, each of which extends along the transverse direction T between opposing ends of the chamber 144. The chambers 144 of a regenerator housing 140 may thus be arranged in a linear array along the longitudinal direction L, as shown. Each stage 130, 132, such as of a pair of stages 130, 132, may be disposed within one of the plurality of chambers 144 of a regenerator housing 140. Accordingly, these stages 130, 132 may be disposed in a linear array along the longitudinal direction L.

As illustrated, in exemplary embodiments, each regenerator housing 140 may include a pair of stages 130, 132. Alternatively, three, four or more stages 130, 132 may be provided in a regenerator housing 140.

Figure 16:
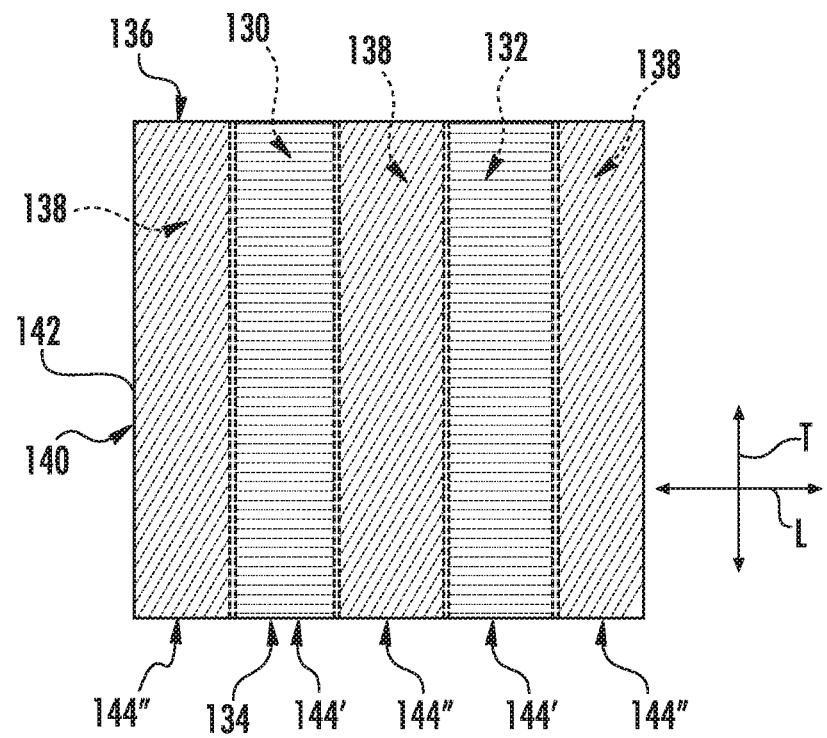
FIG. 16 is a top view of a regenerator housing and MCM stages disposed therein in accordance with one embodiment of the present disclosure.
Figure 17:
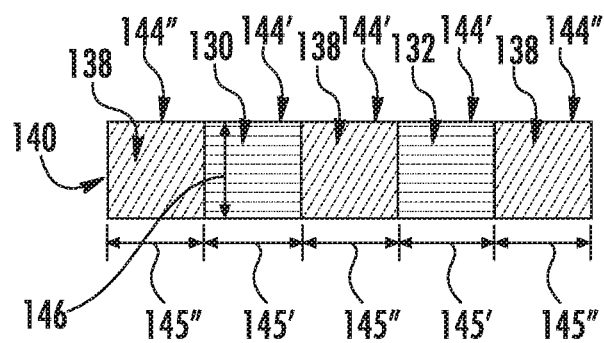
FIG. 17 is a side view of the regenerator housing and MCM stages of FIG. 16.

In some embodiments, as illustrated in FIGS. 5 through 8 and 18, each chamber 144 of the regenerator housing 140 may include a stage 130, 132 therein, and/or neighboring chambers 144 may include stages 130, 132. Alternatively, as illustrated in FIGS. 16 and 17, chambers 144 which are neighbors to those chambers 144 which include a stage 130, 132 may include an insulative material 138. The insulative material may advantageously reduce heat transfer between the stage 130, 132 and ambient, and between the various stages 130, 132 themselves, thus increasing the efficiency of the heat pump 100 generally.

For example, as illustrated in FIGS. 16 and 17, the plurality of chambers 144 may include a plurality of first chambers 144' and at least one, such as in exemplary embodiments a plurality of, second chamber 144". The first and second chambers 144', 144" may be disposed in an alternating arrangement along the longitudinal direction L. Accordingly, neighboring chambers 144 alternate, with first chambers 144' next to second chambers 144" and second chambers 144" next to first chambers 144' along the longitudinal direction L. A first chamber 144' may not be next to another first chamber 144' along the longitudinal direction L, and a second chamber 144" may not be next to another second chamber 144" along the longitudinal direction.

The MCM stages 130, 132 may be disposed in the first chambers 144' (and not in the second chambers 144"). An insulative material 138 (which is not an MCM) may be disposed within the second chambers 144". In some embodiments, the insulative material 138 may simply be air. In other embodiments, the insulative material 138 may be a foam, i.e. a closed cell foam such as a closed cell urethane foam or closed cell expanded polystyrene foam.

In exemplary embodiments, a width 145" (i.e. a maximum width) along the longitudinal direction L of each second chamber 144" may be greater than or equal to one-half of a height 146 (i.e. a maximum height) along the vertical direction V of each first chamber 144'. In some embodiments, a width 145" may be between one-half of a height 146 and a width 145' (i.e. a maximum width) along the longitudinal direction L of each first chamber 144'. In other embodiments, a width 145" may be greater than a width 145'. Such widths 145" relative to the widths 145' and heights 146 may advantageously increase the insulating effects of the insulative material 138.

As illustrated in FIGS. 5, 6 and 18, each stage 130, 132 may define a width 131, 133 along the longitudinal direction L, and each magnet 112, 114 may define a width 113, 115. The widths 113, 115 of the magnets 112, 114 may advantageously be sized such that the magnetic field M is sufficient to energize the stages 130, 132 and thus facilitate optimal operation of the heat pump 100. For example, in exemplary embodiments, the widths 113, 115 may be greater than or equal to the widths 131, 133. In particularly advantageous embodiments, the widths 113, 115 may be greater than the widths 131, 133. Notably, the widths 113, 115 may in some embodiments be limited, and may for example, be less than two times the widths 131, 133. For example, the widths 113, 115 may be between one time and two times the widths 131, 133.

Notably, in exemplary embodiments, widths 113 and 115 may be approximately equal, and widths 131 and 133 may be approximately equal.

The regenerator housing(s) 140 (and associated stages 130, 132) and magnet assembly(s) 110 may be movable relative to each other, such as along the longitudinal direction L. In exemplary embodiments as shown, for example, each regenerator housing 140 (and associated stages 130, 132) is movable relative to an associated magnet assembly 110, such as along the longitudinal direction L. Alternatively, however, each magnet assembly 110 is movable relative to the associated regenerator housing 140 (and associated stages 130, 132), such as along the longitudinal direction L.

Such relative movement (i.e. of a regenerator housing 140 in exemplary embodiments) causes movement each stage 130, 132 into the magnetic field M and out of the magnetic field M. As discussed herein, movement of a stage 130, 132 into the magnetic field M may cause the magnetic moments of the material to orient and the MCM to heat (or alternatively cool) as part of the magnetocaloric effect. When a stage 130, 132 is out of the magnetic field M, the MCM may thus cool (or alternatively heat) due to disorder of the magnetic moments of the material.

For example, a regenerator housing 140 (or an associated magnet assembly 110) may be movable along the longitudinal direction L between a first position and a second position. In the first position (as illustrated for example in FIGS. 3 and 5), the regenerator housing 140 may be positioned such that a first stage 130 disposed within the regenerator housing 140 is within the magnetic field M and a second stage 132 disposed within the regenerator housing 140 is out of the magnetic field M. Notably, being out of the magnetic field M means that the second stage 132 is generally or substantially uninfluenced by the magnets and resulting magnetic field M. Accordingly, the MCM of the stage as a whole may not be actively heating (or cooling) as it would if within the magnetic field M (and instead may be actively or passively cooling (or heating) due to such removal of the magnetic field M). In the second position (as illustrated for example in FIGS. 4 and 6), the regenerator housing 140 may be positioned such that the first stage 130 disposed within the regenerator housing 140 is out of the magnetic field M and the second stage 132 disposed within the regenerator housing 140 is within the magnetic field M.

The regenerator housing 140 (or an associated magnet assembly 110) is movable along the longitudinal direction L between the first position and the second position. Such movement along the longitudinal direction from the first position to the second position may be referred to herein as a first transition, while movement along the longitudinal direction from the second position to the first position may be referred to herein as a second transition.

Figure 8:
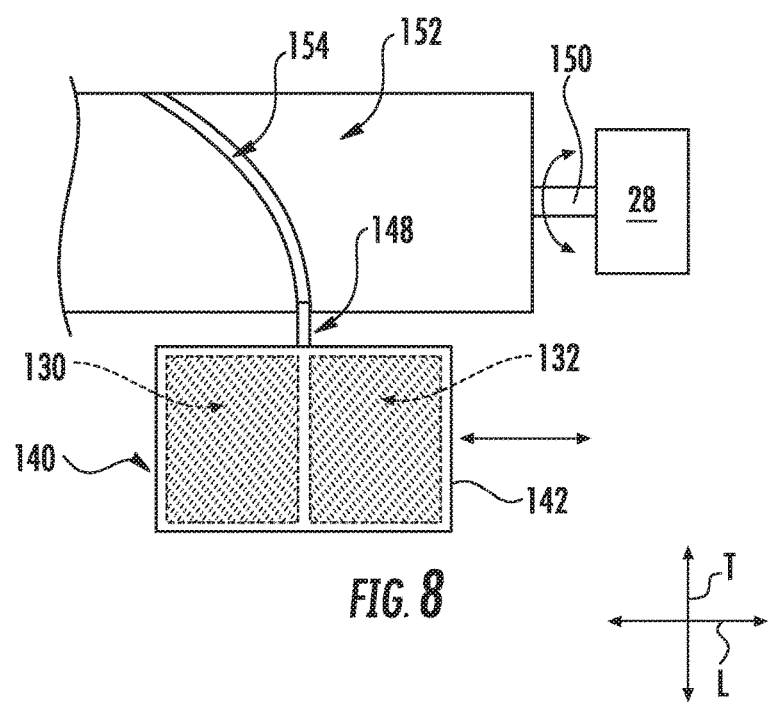
FIG. 8 is a top view of components of a heat pump in accordance with one embodiment of the present disclosure.
Figure 9:
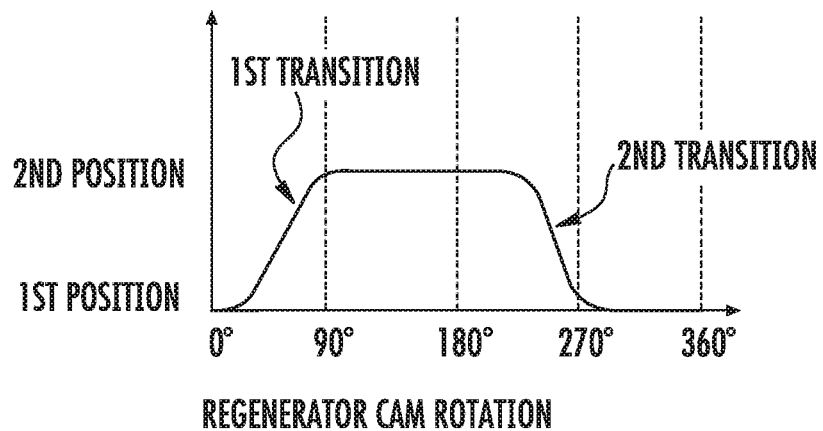
FIG. 9 is a chart illustrating movement of a regenerator housing and associated MCM stages in accordance with one embodiment of the present disclosure.
Figure 20:
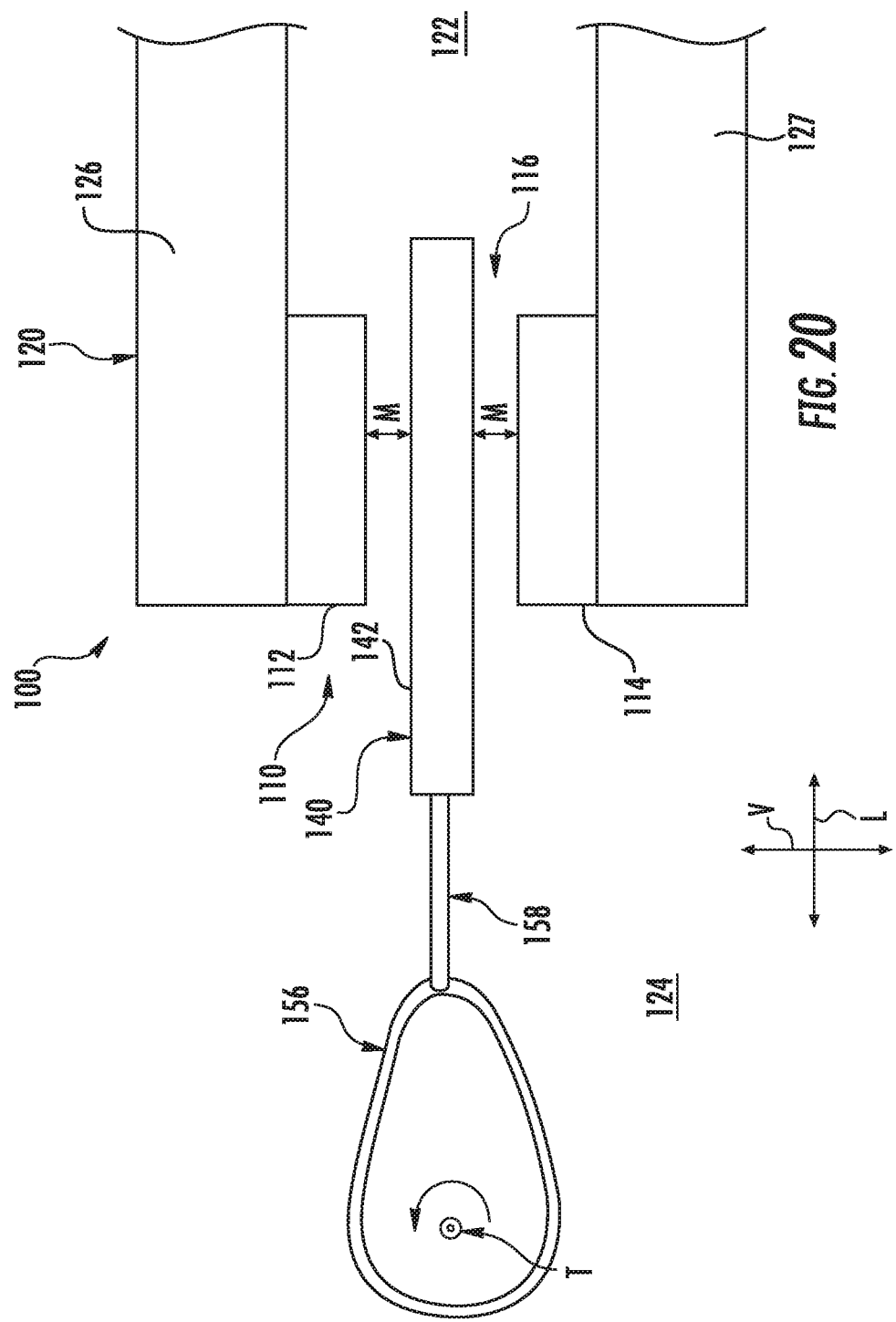
FIG. 20 is a side view of components of a heat pump, including a regenerator housing, magnet assembly and cam, in accordance with one embodiment of the present disclosure.
Figure 21:
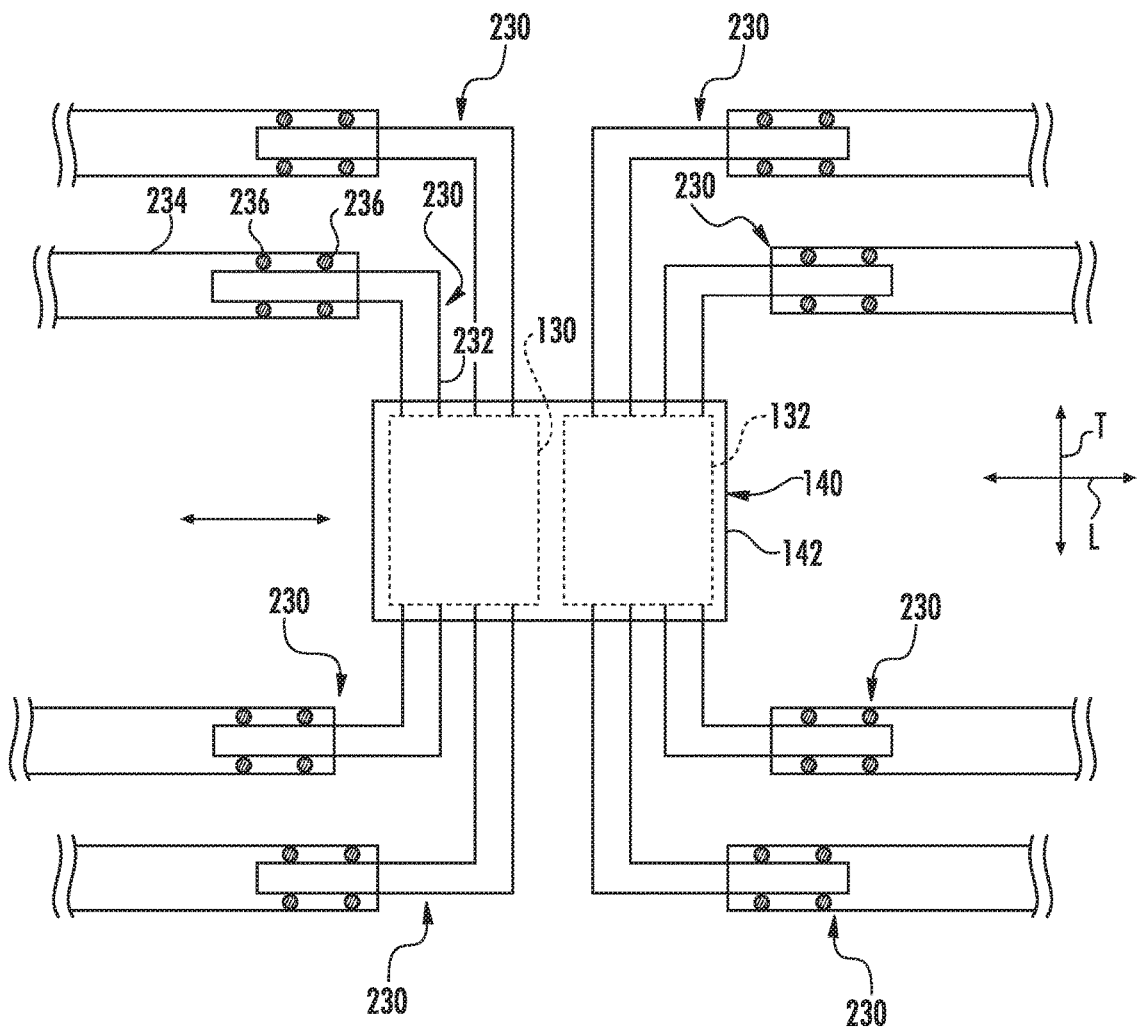
FIG. 21 is a top view of components of a heat pump, including a regenerator housing and MCM stages disposed therein as well as lines extending therefrom.

Referring to FIGS. 8, 9 and 20, movement of a regenerator housing 140 (or an associated magnet assembly 110) may be caused by operation of motor 26. The motor 26 may be in mechanical communication with the regenerator housing 140 (or magnet assembly 110) and configured for moving the regenerator housing 140 (or magnet assembly 110) along the longitudinal direction L (i.e. between the first position and second position). For example, a shaft 150 of the motor 28 may be connected to a cam; i.e. a regenerator cam. The cam may be connected to the regenerator housing 140 (or associated magnet assembly 110), such that relative movement of the regenerator housing 140 and associated magnet assembly 110 is caused by and due to rotation of the cam. The cam may, as shown, be rotational about the longitudinal direction L (see FIGS. 8 and 9) or the transverse direction T (see FIG. 20).

For example, in some embodiments as illustrated in FIGS. 8 and 9, the cam may be a cam cylinder 152. The cam cylinder 152 may be rotational about the longitudinal direction L. A cam groove 154 may be defined in the cam cylinder 152, and a follower tab 148 of the regenerator housing 120 may extend into the cam groove 154. Rotation of the motor 28 may cause rotation of the cam cylinder 152. The cam groove 154 may be defined in a particularly desired cam profile such that, when the cam cylinder 152 rotates, the tab 148 moves along the longitudinal direction L between the first position and second position due to the pattern of the cam groove 154 and in the cam profile, in turn causing such movement of the regenerator housing 120.

In other embodiments, as illustrated in FIG. 20, the cam may be a cam wheel 156. The cam wheel 156 may be rotational about the transverse direction T. A follower rod 158 may be pivotally and movably coupled to and between the cam wheel 156 and the regenerator housing 120. Rotation of the motor 28 may cause rotation of the cam wheel 156. The outer profile of the cam wheel 156 may be defined in a particularly desired cam profile such that, when the cam wheel 156 rotates, the follower rod 158 moves along the longitudinal direction L between the first position and second position due to the pattern of the outer profile of the cam wheel 156 and in the cam profile, in turn causing such movement of the regenerator housing 120.

FIG. 9 illustrates one embodiment of a regenerator cam profile which includes a first position, first transition, second position, and second transition. Notably, in exemplary embodiments the period during which a regenerator housing 140 (or an associated magnet assembly 110) is dwelling in the first position and/or second position may be longer than the period during which the regenerator housing 140 (or an associated magnet assembly 110) is moving in the first transition and/or second transition. Accordingly, the cam profile defined by the cam defines the first position, the second position, the first transition, and the second transition. In exemplary embodiments, the cam profile causes the one of the regenerator housing or the magnet assembly to dwell in the first position and the second position for periods of time longer than time periods in the first transition and second transition.

Figure 19:
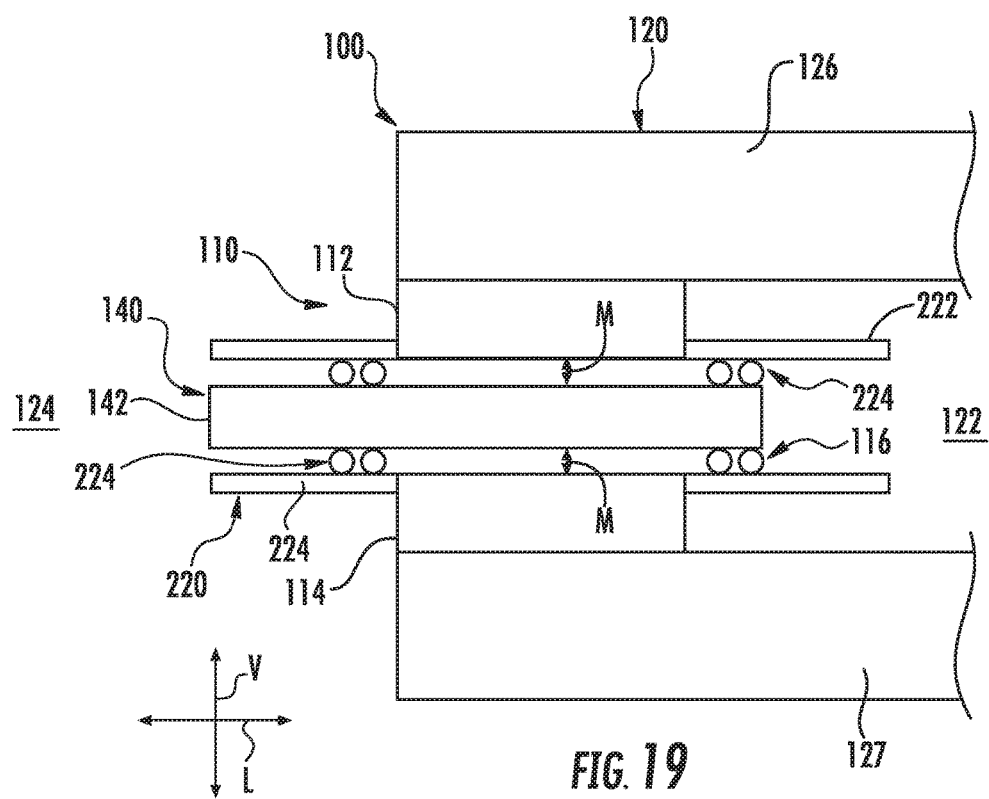
FIG. 19 is a front view of components of a heat pump, including a regenerator housing, magnet assembly and bearing assembly, in accordance with one embodiment of the present disclosure.

Referring now to FIG. 19, in some embodiments the movement of a regenerator housing 140 and magnet assembly 110 relative to each other (i.e. the movement of the regenerator housing 140 relative to the magnet assembly 110 in exemplary embodiments) may advantageously be facilitated via use of a bearing assembly 220. The bearing assembly 220 may support the regenerator housing 140 and magnet assembly 110 relative to each other, maintaining tight tolerances for the gap 116 and causing smooth, efficient movement during operation of the heat pump 100. Notably, to provide such advantages, the regenerator housing 140 may be a component of the bearing assembly 220.

Bearing assembly 220 may, for example, include one or more outer races 222 and a plurality of bearings 224. The bearings 224 may, for example, be ball bearings, wheel bearings, slide bearings, or other suitable bearing components. The regenerator housing 140, such as the outer surface(s) of the body 142 thereof, may serve as the inner race(s) of the bearing assembly. Accordingly, bearings 224 may be disposed between the regenerator housing 140, such as the outer surface(s) of the body 142 thereof, and the outer races 222 along the vertical direction V.

The bearing assembly 220 may further be connected to the magnet assembly 110. For example, each outer race 222 may be connected to the first magnet 112 or the second magnet 114. One or more outer races 222 may be connected to the first magnet 112 and to the second magnet 114. For example, as shown, one outer race 222 connected to the first magnet 112 and the second magnet 114 may be disposed in the interior space 122, which another outer race 222 connected to the first magnet 112 and the second magnet 114 may be disposed in the exterior space 124.

Accordingly, during movement of the regenerator housing 140 between the first position and the second position, the regenerator housing 140 may move relative to the outer races 222 and along the bearings 224, thus facilitating improved movement of the regenerator housing 140.

Figure 3:
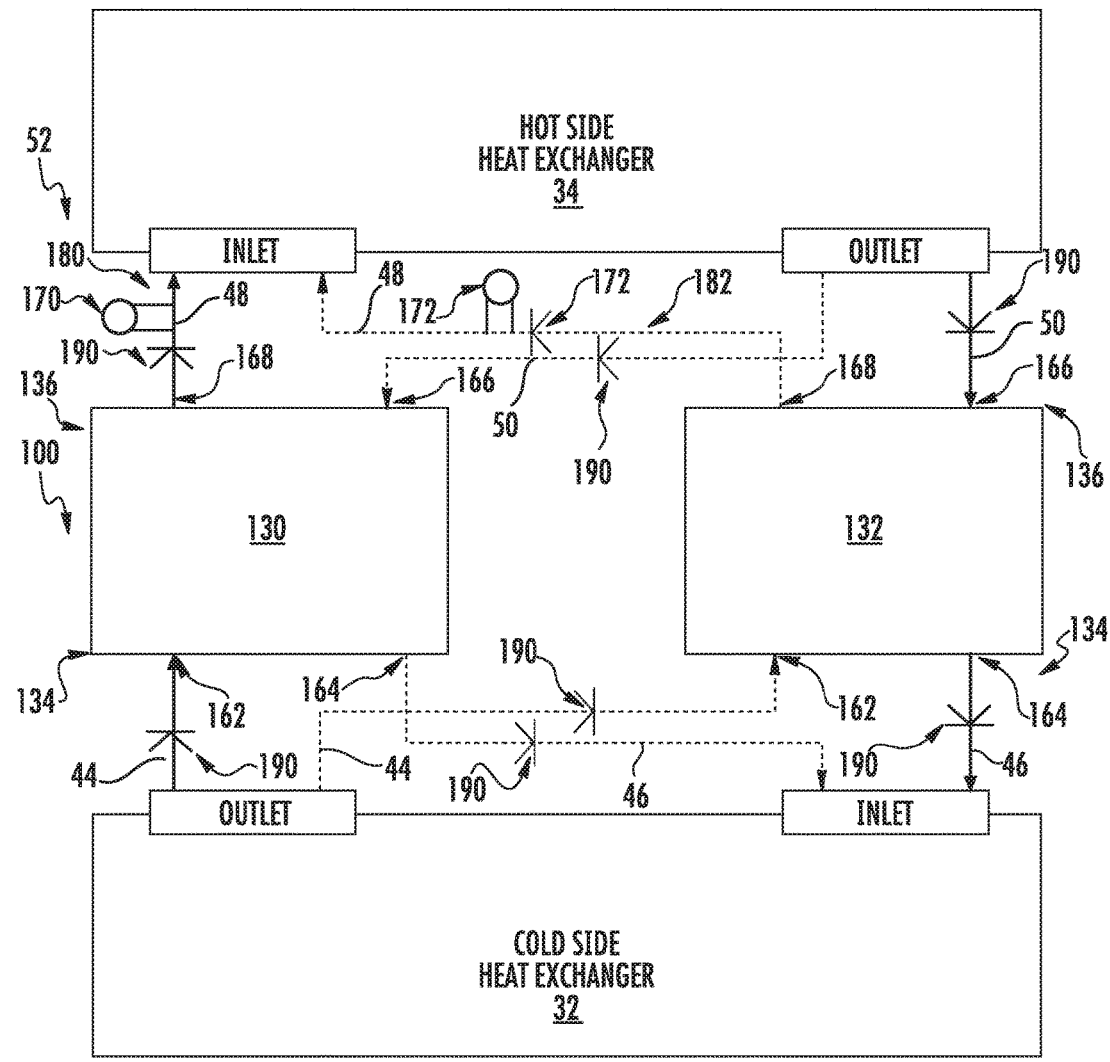
FIG. 3 is a schematic illustration of a heat pump system, with a first stage of MCM within a magnetic field and a second stage of MCM out of a magnetic field, in accordance with one embodiment of the present disclosure.
Figure 4:
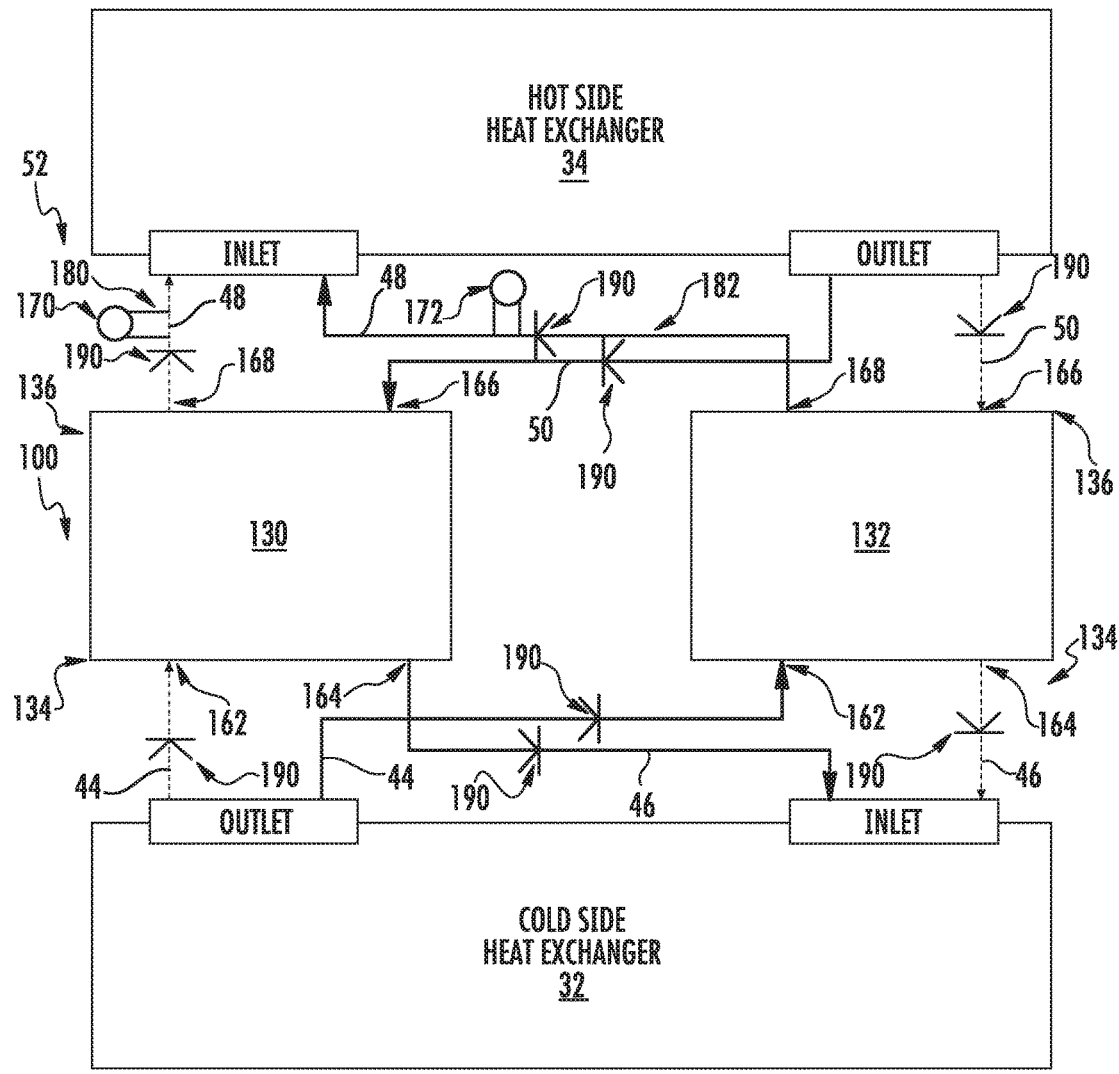
FIG. 4 is a schematic illustration of a heat pump system, with a first stage of MCM out of a magnetic field and a second stage of MCM within a magnetic field, in accordance with one embodiment of the present disclosure.
Figure 7:
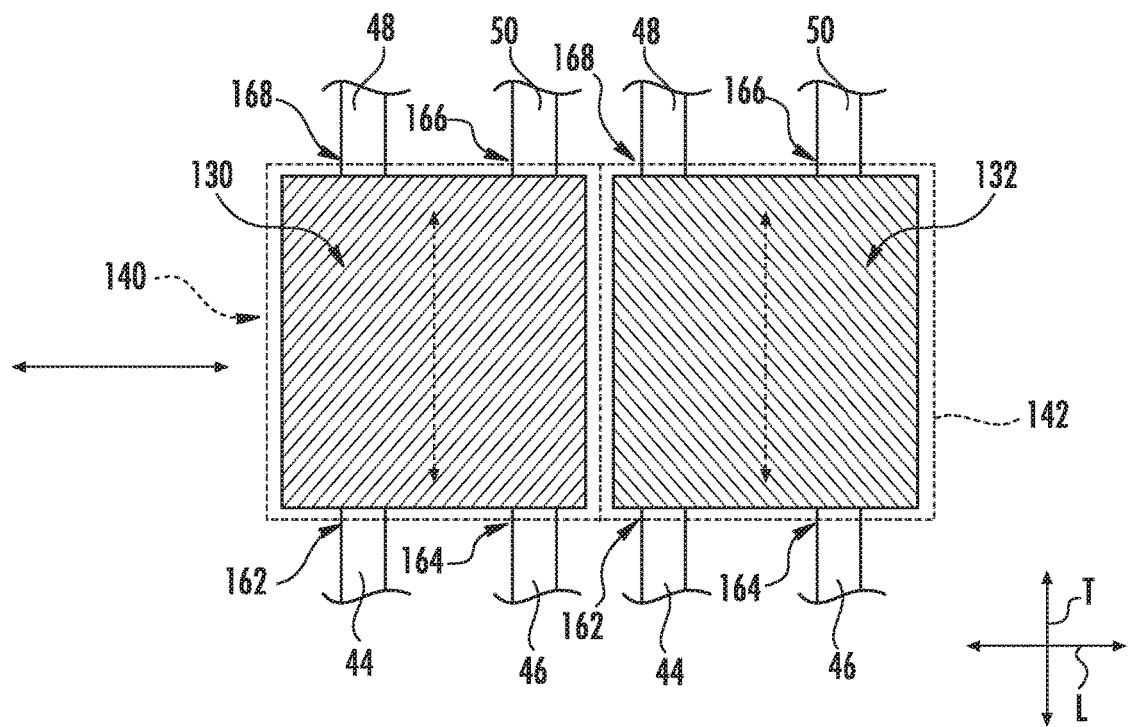
FIG. 7 is a top view of a regenerator housing and MCM stages disposed therein in accordance with one embodiment of the present disclosure.

Referring again to FIG. 2, in some embodiments, lines 44, 46, 48, 50 may facilitate the flow of working fluid between heat exchangers 32, 34 and heat pump 100. Referring now to FIGS. 3, 4, 7 and 12 through 15, in exemplary embodiments such various lines may facilitate the flow of working fluid between heat exchangers 32, 34 and the stages 130, 132 of the heat pump 100. Working fluid may flow to and from each stage 130, 132 through various apertures defined in each stage. The apertures generally define the locations of working fluid flow to or from each stage. In some embodiments as illustrated in FIGS. 3, 4 and 7, multiple apertures (i.e. two apertures) may be defined in the first end 134 and the second end 136 of each stage 130, 132. For example, each stage 130, 132 may define a cold side inlet 162, a cold side outlet 164, a hot side inlet 166 and a hot side outlet 168. The cold side inlet 162 and cold side outlet 164 may be defined in each stage 130, 132 at the first end 134 of the stage 130, 132, and the hot side inlet 166 and hot side outlet 168 may be defined in each stage 130, 132 at the second end 136 of the stage 130, 132. The inlets and outlets may provide fluid communication for the working fluid to flow into and out of each stage 130, 132, and from or to the heat exchangers 32, 34. For example, a line 44 may extend between cold side heat exchanger 32 and cold side inlet 162, such that working fluid from heat exchanger 32 flows through line 44 to cold side inlet 162. A line 46 may extend between cold side outlet 164 and cold side heat exchanger 32, such that working fluid from cold side outlet 164 flows through line 46 to heat exchanger 32. A line 50 may extend between hot side heat exchanger 34 and hot side inlet 166, such that working fluid from heat exchanger 34 flows through line 50 to hot side inlet 166. A line 48 may extend between hot side outlet 168 and hot side heat exchanger 34, such that working fluid from hot side outlet 168 flows through line 48 to heat exchanger 34.

When a regenerator housing 140 (and associated stages 130, 132) is in a first position, a first stage 130 may be within the magnetic field and a second stage 132 may be out of the magnetic field. Accordingly, working fluid in the first stage 130 may be heated (or cooled) due to the magnetocaloric effect, while working fluid in the second stage 132 may be cooled (or heated) due to the lack of magnetocaloric effect. Additionally, when a stage 130, 132 is in the first position or second position, working fluid may be actively flowed to the heat exchangers 32, 34, such as through inlets and outlets of the various stages 130, 132. Working fluid may be generally constant within the stages 130, 132 during the first and second transitions.

Figure 10:
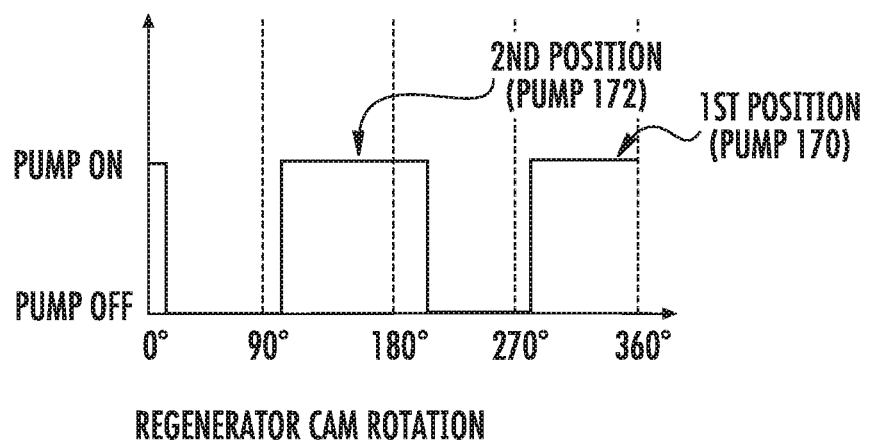
FIG. 10 is a chart illustrating operation of pumps to actively flow working fluid in accordance with one embodiment of the present disclosure.

One or more pumps 170, 172 (each of which may be a pump 42 as discussed herein) may be operable to facilitate such active flow of working fluid when the stages are in the first position or second position. In exemplary embodiments, each pump is or includes a reciprocating piston. For example, a single pump assembly may include two reciprocating pistons. For example, a first pump 170 (which may be or include a piston) may operate to flow working fluid when the stages 130, 132 are in the first position (such that stage 130 is within the magnetic field M and stage 132 is out of the magnetic field M), while a second pump 172 (which may be or include a piston) may operate to flow working fluid when the stages 130, 132 are in the second position (such that stage 132 is within the magnetic field M and stage 130 is out of the magnetic field M). Operation of a pump 170, 172 may cause active flow of working fluid through the stages 130, 132, heat exchangers 32, 34, and system 52 generally. Each pump 170, 172 may be in fluid communication with the stages 130, 132 and heat exchangers 32, 34, such as on various lines between stages 130, 132 and heat exchangers 32, 34. In exemplary embodiments as shown, the pumps 170, 172 may be on "hot side" lines between the stages 130, 132 and heat exchanger 34 (i.e. on lines 48). Alternatively, the pumps 170, 172 may be on "cold side" lines between the stages 130, 132 and heat exchanger 32 (i.e. on lines 44). Referring briefly to FIG. 10, operation of the pumps 170, 172 relative to movement of a regenerator housing 140 and associated stages 130, 132 through a cam profile is illustrated. First pump 170 may operate when the stages are in the first position, and second pump 172 may operate when the stages are in the second position.

Working fluid may be flowable from a stage 130, 132 through the hot side outlet 168 and to the stage 130, 132 through the cold side inlet 162 when the stage is within the magnetic field M. Working fluid may be flowable from a stage 130, 132 through the cold side outlet 164 and to the stage through the hot side inlet 166 during movement of the stage 130, 132 when the stage is out of the magnetic field M. Accordingly, and referring now to FIGS. 3 and 4, a first flow path 180 and a second flow path 182 may be defined. Each flow path 180 may include flow through a first stage 130 and second stage 132, as well as flow through cold side heat exchanger 32 and hot side heat exchanger 34. The flow of working fluid may occur either along the first flow path 180 or the second flow path 182, depending on the positioning of the first and second stages 130, 132.

FIG. 3 illustrates a first flow path 180, which may be utilized in the first position. In the first position, the first stage 130 is within the magnetic field M, and the second stage 132 is out of the magnetic field M. Activation and operation of pump 170 may facilitate active working fluid flow through the first flow path 180. As shown, working fluid may flow from cold side heat exchanger 32 through line 44 and cold side inlet 162 of first stage 130 to the first stage 130, from the first stage 130 through hot side outlet 168 and line 48 of the first stage 130 to the hot side heat exchanger 34, from hot side heat exchanger 34 through line 50 and hot side inlet 166 of the second stage 132 to the second stage 132, and from the second stage 132 through cold side outlet 164 and line 46 of the second stage 132 to the cold side heat exchanger 32.

FIG. 4 illustrates a second flow path 182, which may be utilized during the second position. In the second position, the second stage 132 is within the magnetic field M, and the first stage 130 is out of the magnetic field M. Activation and operation of pump 172 may facilitate active working fluid flow through the second flow path 182. As shown, working fluid may flow from cold side heat exchanger 32 through line 44 and cold side inlet 162 of second stage 132 to the second stage 132, from the second stage 132 through hot side outlet 168 and line 48 of the second stage 132 to the hot side heat exchanger 34, from hot side heat exchanger 34 through line 50 and hot side inlet 166 of the first stage 130 to the first stage 130, and from the first stage 130 through cold side outlet 164 and line 46 of the first stage 130 to the cold side heat exchanger 32.

Notably, check valves 190 may in some embodiments be provided on the various lines 44, 46, 48, 50 to prevent backflow there-through. The check valves 190, in combination with differential pressures during operation of the heat pump 100, may thus generally prevent flow through the improper flow path when working fluid is being actively flowed through one of the flow paths 190, 192.

Referring now to FIGS. 12 through 15, in alternative embodiments only a single aperture may be defined in the first end 134 and the second end 136 of each stage 130, 132. As illustrated, a first aperture 202 is defined in the first end 134, and a second aperture 204 is defined in the second end 136. The working fluid is flowable (i.e. via operation of the pumps 170, 172 as discussed herein) both to and from the stages 130, 132 through the first and second apertures 202, 204 thereof. For example, working fluid may be flowable from a stage 130, 132 though the second aperture 204 and to the stage 130, 132 through the first aperture 202 when the stage 130, 132 is in the magnetic field M. Working fluid may be flowable from a stage 130, 132 though the first aperture 202 and to the stage 130, 132 through the second aperture 204 when the stage 130, 132 is out of the magnetic field M.

The flow of working fluid to or from a stage 130, 132 may flow into or from a line 44, 46, 48, 50, and this flow may then continue through the stage and/or to a heat exchanger 32, 34 as described herein. To facilitate such flow to or from the lines 44, 46, 48, 50, seals may be provided adjacent and in contact with the first ends 134 and second ends 136 of the stages 130, 132. The stages 130, 132 may be movable between the first position and second position relative to the stages 130, 132. As shown, one or more first seals 206 may be positioned adjacent to (along the transverse direction T) and in contact with the first ends 136, and one or more second seals 208 may be positioned adjacent to (along the transverse direction T) and in contact with the second ends 138. In exemplary embodiments, the seals 206, 208 may be formed from polytetrafluoroethylene or another suitable material to facilitate a tight seal with the stages 130, 132 while having low friction and allowing movement of the stages 130, 132 between the first position and second position.

Each seal 206 may include and define a plurality of ports through which working fluid may be selectively flowed to/from lines 44, 46, 48, 50. When a first aperture 202 is aligned with a port in the first seal 206, working fluid may flow to or from the stage 130, 132 through the first aperture 202 and port. When a second aperture 204 is aligned with a port in the second seal 208, working fluid may flow to or from the stage 130, 132 through the second aperture 204 and port. Specifically, in exemplary embodiments as illustrated, the first aperture 202 of a stage 130, 132 may be aligned with a port of the first seal 206 and the second aperture 204 of the stage 130, 132 is aligned with a port of the second seal 208 when the stage 130, 132 is in the first position or the second position. Notably, the ports with which the apertures 202, 204 are aligned in the first position in exemplary embodiments are different from the ports with which the apertures 202, 204 are aligned in the second position. Further, the first aperture 202 of the stage 130, 132 is not aligned with any port of the first seal 206 and the second aperture 204 of the stage 130, 132 is not aligned with any port of the second seal 208 when the stage 130, 132 is moving between the first position and the second position (i.e. in the first transition or second transition).

For example, a first seal 206 may include and define a cold side inlet port 212 and a cold side outlet port 214 for one or more of the stages 130, 132. The second seal 208 may include and define a hot side inlet port 216 and a hot side outlet port 218 for one or more stages 130,132. The inlet ports and outlet ports may provide fluid communication for the working fluid to flow into and out of each stage 130, 132, and from or to the heat exchangers 32, 34. For example, a line 44 may extend between cold side heat exchanger 32 and cold side inlet port 212, such that working fluid from heat exchanger 32 flows through line 44 to cold side inlet 212. A line 46 may extend between cold side outlet port 214 and cold side heat exchanger 32, such that working fluid from cold side outlet port 214 flows through line 46 to heat exchanger 32. A line 50 may extend between hot side heat exchanger 34 and hot side inlet port 216, such that working fluid from heat exchanger 34 flows through line 50 to hot side inlet port 216. A line 48 may extend between hot side outlet port 218 and hot side heat exchanger 34, such that working fluid from hot side outlet port 218 flows through line 48 to heat exchanger 34.

Working fluid may be flowable from the second aperture 204 of a stage 130, 132 through the hot side outlet port 218 (and thus to line 48), and to the first aperture 202 of the stage 130, 132 through the cold side inlet port 212 (and thus from line 44) when the stage 130, 132 is in the magnetic field M (and in the first or second position). Accordingly, and as illustrated in FIGS. 12 and 13, the first aperture 202 may be aligned with cold side inlet port 212 and the second aperture 204 may be aligned with the hot side outlet port 218 along the longitudinal axis L. Working fluid may be flowable to the second aperture 204 of a stage 130, 132 through the hot side inlet port 216 (and thus from line 50), and from the first aperture 202 of the stage 130, 132 through the cold side outlet port 214 (and thus to line 46) when the stage 130, 132 is out of the magnetic field M (and in the first or second position). Accordingly, and as illustrated in FIGS. 12 and 15, the first aperture 202 may be aligned with cold side outlet port 214 and the second aperture 204 may be aligned with the hot side inlet port 216 along the longitudinal axis L. When the stages 130, 132 are moving between the first and second position in the first transition or second transition, as illustrated in FIG. 14, the first apertures 202 and second apertures 204 may be aligned with the surfaces of the respective seals 206, 208, and not aligned with any ports, such that no flow occurs to or from the stages 130, 132.

As discussed, lines 44, 46, 48, 50 may be in fluid communication with each of the plurality of stages, either directly or via seals. In some embodiments (such as for example when seals are utilized and the lines may be generally stationary during heat pump 100 operation), the lines 44, 46, 48, 50 may be relatively stiff lines. In other embodiments (such as for example when the lines 44, 46, 48, 50 are directly connected to the stages and may thus move during heat pump 100 operation), the lines 44, 46, 48, 50 may be flexible lines. In particularly exemplary embodiments of flexible lines, the lines may be axially flexible and radially stiff, thus facilitating movement during operation of the heat pump 100 while maintaining structural integrity.

For example, the flexible lines 44, 46, 48, 50 may each be formed from one of a polyurethane, a rubber, or a polyvinyl chloride, or another suitable polymer or other material. In exemplary embodiments, the lines 44, 46, 48, 50 may further be fiber impregnated, and thus include embedded fibers, or may be otherwise reinforced. For example, glass, carbon, polymer or other fibers may be utilized, or other polymers such as polyester may be utilized to reinforce the lines 44, 46, 48, 50.

In some exemplary embodiments, each line 44, 46, 48, 50 may have a relatively small minimum bend radius, such as less than or equal to 2 inches, less than or equal to 1.5 inches, less than or equal to 1 inch, less than or equal to 0.5 inches, or between 2 inches and 0.25 inches.

Additionally or alternatively, each line 44, 46, 48, 50 may have a relatively high burst pressure rating, such as greater than or equal to 50 pounds per square inch ("PSI"), such as greater than or equal to 100 PSI, such as greater than or equal to 250 PSI, such as greater than or equal to 400 PSI, such as between 50 PSI and 500 PSI.

Additionally or alternatively, each line 44, 46, 48, 50 may have a relatively small outer diameter, such as less than or equal to 0.5 inches, such as less than or equal to 0.25 inches, such as between 0.5 inches and 0.125 inches.

In some embodiments, each line 44, 46, 48, 50 may be a singular component that extends between a heat exchanger and a stage or seal. In other embodiments, and in particular in embodiments wherein the lines 44, 46, 48, 50 are rigid, each line may be formed from multiple components which may be movable relative to each other. Such embodiments may be particularly applicable when the lines 44, 46, 48, 50 are directly connected to the stages and may thus move during heat pump 100 operation. For example, and referring now to FIG. 21, each line 230 (which could be a line 44, 46, 48 or 50) may include an inner sleeve 232 and an outer sleeve 234. The inner sleeve 232 may be at least partially disposed within the outer sleeve 234, and the inner sleeve 232 and outer sleeve 234 may be in fluid communication such that working fluid flows from the inner sleeve 232 into the outer sleeve 234 and/or from the outer sleeve 234 to the inner sleeve 232 at the intersection therebetween. Further, one of the inner sleeve 232 or outer sleeve 234 may be movable relative to the other of the inner sleeve 232 or outer sleeve 234. Such movement may occur during operation of the heat pump 100, and specifically during movement of the regenerator housing 120 or magnet assembly 110, such as relative to the other between the first position and second position. The use of inner and outer sleeves and such relative movement may advantageously allow for the working fluid to be transmitted between the moving regenerator housing 120 (and stages 130, 132 thereof) and stationary heat exchangers 130, 132 in a relatively efficient manner, with high reliability and with little or no fluid dead space during operation.

The relative movement of the inner sleeve 232 or outer sleeve 234 of each line 230 in exemplary embodiments is along the longitudinal direction L. In exemplary embodiments, the inner sleeve 232 of each line 230 may be movable relative to the outer sleeve 234, such as along the longitudinal direction L.

Additionally or alternatively, the inner sleeve 232 of each line 230 may be connected to one of the plurality of stages 130, 132. Accordingly, working fluid may enter a stage 130, 132 from an associated inner sleeve 232 or be exhausted from a stage 130, 132 into an associated inner sleeve 232. In these embodiments, the outer sleeve 234 may be connected to one of the heat exchangers 32, 34. Accordingly, working fluid may enter a heat exchanger 32, 34 from an associated outer sleeve 234 or be exhausted from a heat exchanger 32, 34 into an associated outer sleeve 234. One or more seal members 236 may be provided in each line 230, and may be disposed between the inner sleeve 232 and the outer sleeve 234 of the line 230 to prevent leakage at the intersection of the inner sleeve 232 and outer sleeve 234. In exemplary embodiments as shown, the seal member(s) 236 are O-rings, although other suitable seal members 236 may be utilized.

Figure 11:
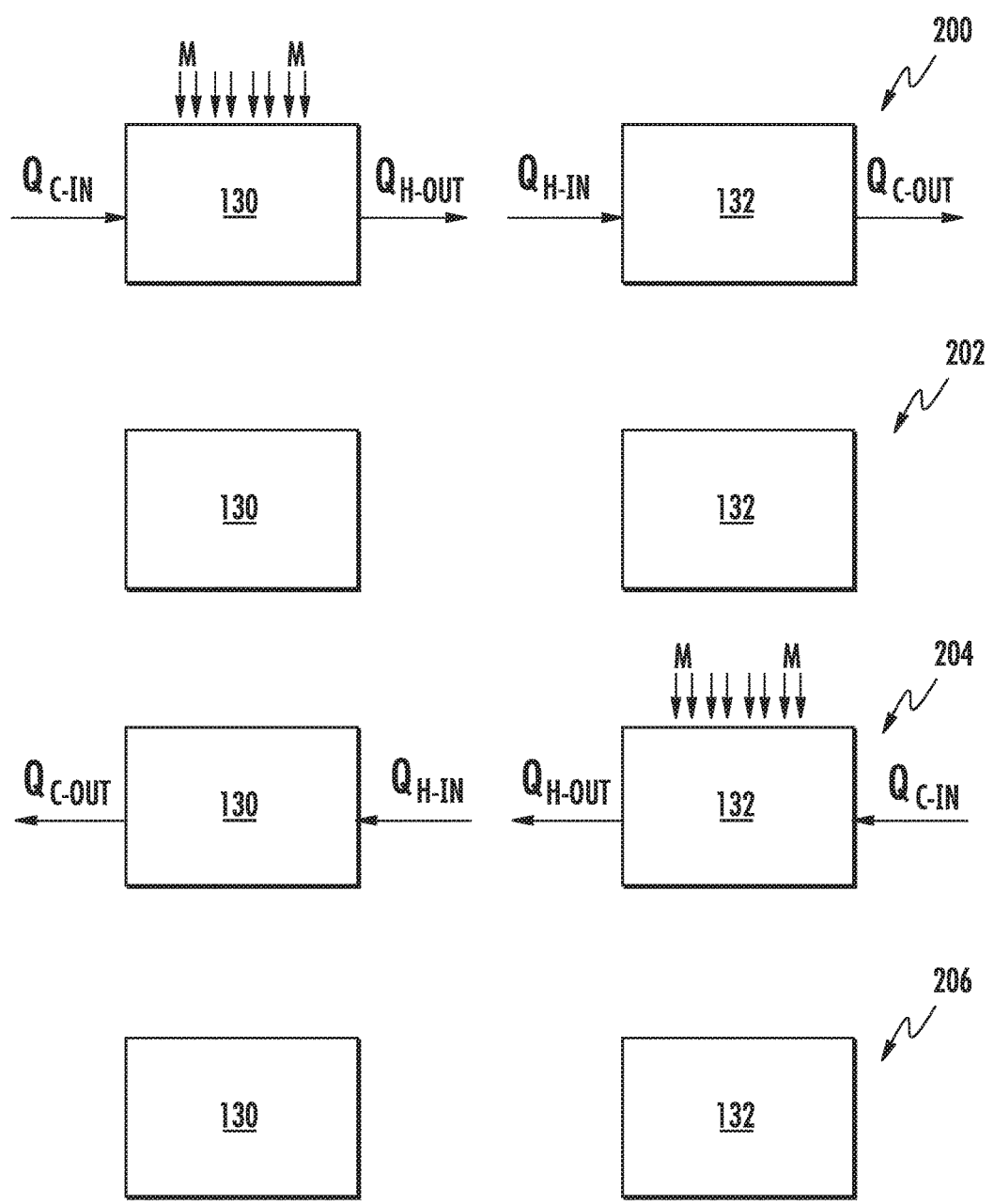
FIG. 11 is a schematic diagram illustrating various positions and movements there-between of MCM stages in accordance with one embodiment of the present disclosure.

FIG. 11 illustrates an exemplary method of the present disclosure using a schematic representation of associated stages 130, 132 of MCM during dwelling in and movement between the various positions as discussed herein. With regard to the first stage 130, during step 200, which corresponds to the first position, stage 130 is fully within magnetic field M, which causes the magnetic moments of the material to orient and the MCM to heat as part of the magneto caloric effect. Further, the pump 170 is activated to actively flow working fluid in the first flow path 180. As indicated by arrow $Q_{H\text{-}OUT}$, working fluid in stage 130, now heated by the MCM, can travel out of the stage 130 and along line 48 to the second heat exchanger 34. At the same time, and as indicated by arrow $Q_{H\text{-}IN}$, working fluid from first heat exchanger 32 flows into stage 130 from line 44. Because working fluid from the first heat exchanger 32 is relatively cooler than the MCM in stage 130, the MCM will lose heat to the working fluid.

In step 202, stage 130 is moved from the first position to the second position in the first transition. During the time in the first transition, working fluid dwells in the MCM of stage 130. More specifically, the working fluid does not actively flow through stage 130.

In step 204, stage 130 is in the second position and thus out of magnetic field M. The absence or lessening of the magnetic field is such that the magnetic moments of the material become disordered and the MCM absorbs heat as part of the magnetocaloric effect. Further, the pump 172 is activated to actively flow working fluid in the second flow path 182. As indicated by arrow $Q_{C\text{-}OUT}$, working fluid in stage 130, now cooled by the MCM, can travel out of stage 130 and along line 46 to the first heat exchanger 32. At the same time, and as indicated by arrow $Q_{C\text{-}IN}$, working fluid from second heat exchanger 34 flows into stage 112 from line 50 when stage 130 is in the second transition. Because working fluid from the second heat exchanger 34 is relatively warmer than the MCM in stage 130, the MCM will lose some of its heat to the working fluid. The working fluid now travels along line 46 to the first heat exchanger 32 to receive heat and cool the refrigeration compartment 30.

In step 206, stage 130 is moved from the second position to the first position in the second transition. During the time in the second transition, the working fluid dwells in the MCM of stage 130. More specifically, the working fluid does not actively flow through stage 130.

With regard to the second stage 132, during step 200, which corresponds to the first position, the second stage 132 is out of magnetic field M. The absence or lessening of the magnetic field is such that the magnetic moments of the material become disordered and the MCM absorbs heat as part of the magnetocaloric effect. Further, the pump 170 is activated to actively flow working fluid in the first flow path 180. As indicated by arrow $Q_{C\text{-}OUT}$, working fluid in stage 132, now cooled by the MCM, can travel out of stage 132 and along line 46 to the first heat exchanger 32. At the same time, and as indicated by arrow $Q_{C\text{-}IN}$, working fluid from second heat exchanger 34 flows into stage 112 from line 50 when stage 132 is in the second transition. Because working fluid from the second heat exchanger 34 is relatively warmer than the MCM in stage 132, the MCM will lose some of its heat to the working fluid. The working fluid now travels along line 46 to the first heat exchanger 32 to receive heat and cool the refrigeration compartment 30.

In step 202, stage 132 is moved from the first position to the second position in the first transition. During the time in the first transition, the working fluid dwells in the MCM of stage 132. More specifically, the working fluid does not actively flow through stage 132.

In step 204, stage 132 is in the second position and thus fully within magnetic field M, which causes the magnetic moments of the material to orient and the MCM to heat as part of the magneto caloric effect. Further, the pump 172 is activated to actively flow working fluid in the second flow path 182. As indicated by arrow $Q_{H\text{-}OUT}$, working fluid in stage 132, now heated by the MCM, can travel out of the stage 132 and along line 48 to the second heat exchanger 34. At the same time, and as indicated by arrow $Q_{H\text{-}IN}$, working fluid from first heat exchanger 32 flows into stage 132 from line 44. Because working fluid from the first heat exchanger 32 is relatively cooler than the MCM in stage 132, the MCM will lose heat to the working fluid.

In step 206, stage 132 is moved from the second position to the first position in the second transition. During the time in the second transition, working fluid dwells in the MCM of stage 132. More specifically, the working fluid does not actively flow through stage 132.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A heat pump, comprising:
   a magnet assembly, the magnet assembly creating a magnetic field;
   a regenerator housing, the regenerator housing comprising a body defining a plurality of chambers, each of the plurality of chambers extending along a transverse direction orthogonal to the vertical direction;
   a plurality of stages, each of the plurality of stages comprising a magnetocaloric material disposed within a respective one of the plurality of chambers and extending along the transverse direction between a first end and a second end of each stage; and
   a cam connected to one of the regenerator housing or the magnet assembly,
   wherein the one of the regenerator housing or the magnet assembly is linearly movable relative to the other of the regenerator housing or the magnet assembly along a longitudinal direction orthogonal to the vertical direction and the transverse direction due to rotation of the cam, and
   wherein each of the plurality of stages defines a cold side inlet and a cold side outlet at the first end and a hot side inlet and a hot side outlet at the second end such that working fluid is flowable through each of the plurality of stages along the transverse direction.

2. The heat pump of claim 1, wherein the regenerator housing is movable relative to the magnet assembly, and wherein the cam is connected to the regenerator housing.

3. The heat pump of claim 1, wherein the Calla is rotatable about the transverse direction.

4. The heat pump of claim 1, wherein the care is rotatable about the longitudinal direction.

5. The heat pump of claim 1, wherein the cam is a cam wheel.

6. The heat pump of claim 1, wherein the cam is a cam cylinder.

7. The heat pump of claim 1, wherein in a first position along the longitudinal direction the regenerator housing is positioned such that a first stage of the plurality of stages is within the magnetic field and a second stage of the plurality of stages is out of the magnetic field, and wherein in a second position along the longitudinal direction the regenerator housing is positioned such that the first stage of the plurality of stages is out of the magnetic field and the second stage of the plurality of stages is within the magnetic field.

8. The heat pump of claim 7, Wherein a cam profile defined by the cam defines the first position, the second position, a first transition between the first position and the second position, and a second transition between the first position and the second position, and wherein the cam profile is sized and shaped to cause the one of the regenerator housing or the magnet assembly to dwell in the first position and the second position for periods of time longer than time periods in the first transition and second transition.

9. The heat pump of claim 1, further comprising a motor in mechanical communication with the one of the regenerator housing or the magnet assembly and configured for moving the one of the regenerator housing or the magnet assembly along the longitudinal direction.

10. The heat pump of claim 9, wherein the motor is in mechanical communication with the regenerator housing.

11. A heat pump system, comprising:
a cold side heat exchanger configured for heat removal from a first local environment;
a hot side heat exchanger configured for heat delivery to a second local environment;
a first pump for circulating a working fluid between the cold side heat exchanger and the hot side heat exchanger;
a second pump for circulating a working fluid between the cold side heat exchanger and the hot side heat exchanger; and
a heat pump in fluid communication with the cold side heat exchanger, the hot side heat exchanger, the first pump and the second pump, the heat pump comprising:
  a magnet assembly, the magnet assembly creating a magnetic field;
  a regenerator housing, the regenerator housing comprising a body defining a plurality of chambers, each of the plurality of chambers extending along a transverse direction orthogonal to the vertical direction;
  a plurality of stages, each of the plurality of stages comprising a magnetocaloric material disposed within one of the plurality of chambers and extending along the transverse direction between a first end and a second end; and
  a cam connected to one of the regenerator housing or the magnet assembly,
wherein the one of the regenerator housing or the magnet assembly is movable relative to the other of the regenerator housing or the magnet assembly along a longitudinal direction orthogonal to the vertical direction and the transverse direction due to rotation of the cam, and
wherein each of the plurality of stages defines a cold side inlet and a cold side outlet at the first end and a hot side inlet and a hot side outlet at the second end such that working fluid is flowable through each of the plurality of stages along the transverse direction.

12. The heat pump system of claim 11, wherein the regenerator housing is movable relative to the magnet assembly.

13. The heat pump system of claim 11, wherein the cam is rotatable about the transverse direction.

14. The heat pump system of claim 11, wherein the cam is rotatable about the longitudinal direction.

15. The heat pump system of claim 11, wherein the cam is a cam wheel.

16. The heat pump system of claim 11, wherein the cam is a cam cylinder.

17. The heat pump system of claim 11, wherein in a first position along the longitudinal direction the regenerator housing is positioned such that a first stage of the plurality of stages is within the magnetic field and a second stage of the plurality of stages is out of the magnetic field, and wherein in a second position along the longitudinal direction the regenerator housing is positioned such that the first stage of the plurality of stages is out of the magnetic field and the second stage of the plurality of stages is within the magnetic field.

18. The heat pump system of claim 17, wherein a cam profile defined by the cam defines the first position, the second position, a first transition between the first position and the second position, and a second transition between the first position and the second position, and wherein the cam profile is sized and shaped to cause the one of the regenerator housing or the magnet assembly to dwell in the first position and the second position for periods of time longer than time periods in the first transition and second transition.

19. The heat pump system of claim 11, further comprising a motor in mechanical communication with the one of the regenerator housing or the magnet assembly and configured for moving the one of the regenerator housing or the magnet assembly along the longitudinal direction.

20. The heat pump system of claim 19, wherein the motor is in mechanical communication with the regenerator housing.

* * * * *

UNITED STATES PATENT AND TRADEMARK OFFICE
CERTIFICATE OF CORRECTION

PATENT NO. : 10,047,979 B2
APPLICATION NO. : 15/213547
DATED : August 14, 2018
INVENTOR(S) : Michael Alexander Benedict et al.

Page 1 of 1

It is certified that error appears in the above-identified patent and that said Letters Patent is hereby corrected as shown below:

In the Claims

Claim 3: In Column 18, Line 35 - "Calla" should read "cam";

Claim 4: In Column 18, Line 37 - "care" should read "cam";

Claim 8: In Column 18, Line 52 - "Wherein" should read "wherein".

Signed and Sealed this
Eleventh Day of December, 2018

Andrei Iancu
*Director of the United States Patent and Trademark Office*